(12) United States Patent
Ichigaya et al.

(10) Patent No.: US 11,394,958 B2
(45) Date of Patent: Jul. 19, 2022

(54) IMAGE ENCODING DEVICE, IMAGE DECODING DEVICE AND PROGRAM

(71) Applicant: NIPPON HOSO KYOKAI, Tokyo (JP)

(72) Inventors: Atsuro Ichigaya, Tokyo (JP);
Shunsuke Iwamura, Tokyo (JP);
Shimpei Nemoto, Tokyo (JP);
Kazuhisa Iguchi, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

(21) Appl. No.: 17/035,208

(22) Filed: Sep. 28, 2020

(65) Prior Publication Data
US 2021/0014481 A1    Jan. 14, 2021

Related U.S. Application Data

(63) Continuation of application No. PCT/JP2019/014359, filed on Mar. 29, 2019.

(30) Foreign Application Priority Data

Mar. 29, 2018 (JP) .............................. JP2018-065886
Mar. 29, 2018 (JP) .............................. JP2018-065895

(51) Int. Cl.
*H04N 19/105* (2014.01)
*H04N 19/117* (2014.01)
(Continued)

(52) U.S. Cl.
CPC ......... *H04N 19/105* (2014.11); *G06K 9/6215* (2013.01); *H04N 19/117* (2014.11);
(Continued)

(58) Field of Classification Search
CPC combination set(s) only.
See application file for complete search history.

(56) References Cited

U.S. PATENT DOCUMENTS

2005/0117640 A1*  6/2005  Han ...................... H04N 19/31
                                                                     375/240.03
2011/0122953 A1    5/2011  Nakagami et al.
(Continued)

FOREIGN PATENT DOCUMENTS

JP      2000-059785 A     2/2000
WO      2010/010942 A1    1/2010
(Continued)

OTHER PUBLICATIONS

International Telecommunication Union; "High Efficiency Video Coding"; Rec. H.265; Nov. 2019; pp. 1-712.
(Continued)

*Primary Examiner* — Dave Czekaj
*Assistant Examiner* — Shanika M Brumfield
(74) *Attorney, Agent, or Firm* — Studebaker & Brackett PC

(57) ABSTRACT

An image encoding device (1) includes a motion compensation predictor (109) configured to generate a prediction image corresponding to a target image by performing motion compensation prediction using a plurality of reference images, and an evaluator (111) configured to evaluate prediction accuracy of the prediction image for each image portion including one or more pixels by calculating a degree of similarity between the plurality of reference images for each image portion.

9 Claims, 20 Drawing Sheets

REFERENCE IMAGE 1

ENCODING TARGET IMAGE

REFERENCE IMAGE 2

PREDICTION IMAGE

PREDICTION RESIDUAL

(51) Int. Cl.
*H04N 19/124* (2014.01)
*H04N 19/176* (2014.01)
*H04N 19/60* (2014.01)
*H04N 19/82* (2014.01)
*G06K 9/62* (2022.01)

(52) U.S. Cl.
CPC ......... *H04N 19/124* (2014.11); *H04N 19/176* (2014.11); *H04N 19/60* (2014.11); *H04N 19/82* (2014.11)

(56) References Cited

U.S. PATENT DOCUMENTS

| | | |
|---|---|---|
| 2012/0263237 A1 | 10/2012 | Koyama et al. |
| 2012/0263238 A1 | 10/2012 | Miyoshi et al. |
| 2013/0259122 A1* | 10/2013 | Sugio ............... H04N 13/00 375/240.08 |
| 2013/0322519 A1* | 12/2013 | Choi ............... H04N 19/105 375/240.02 |
| 2014/0286429 A1* | 9/2014 | Arakage ............ H04N 19/52 375/240.16 |
| 2019/0230350 A1* | 7/2019 | Chen ............... H04N 19/573 |

FOREIGN PATENT DOCUMENTS

| | | |
|---|---|---|
| WO | 2011/080806 A1 | 7/2011 |
| WO | 2011/080807 A1 | 7/2011 |

OTHER PUBLICATIONS

Shunsuke Iwamura et al.; "Description of SDR and HDR video coding technology proposal by NHK and SHARP" Joint Video Exploration Team (JVET) of ITU-T; SG 16 WP 3 and ISO/IEC JTC 1/SC 29/WG 11 10th Meeting; Apr. 10-20, 2018; pp. i, 1-10; San Diego, CA, USA.

International Search Report issued in PCT/JP2019/014359; dated Jun. 18, 2019.

Shunsuke Iwamura et al., Description of SDR and HDR video coding technology proposal by NHK and SHARP, Joint Video Exploration Team (JVET) of ITU-T SG 16 WP 3 and ISO/IEC JTC 1/SC 29/WG 11, 10th Meeting: San Diego, US, Apr. 10-20, 2018, JVET-J0027_v1, pp. i, 1-10.

Office Action issued in JP 2020-509368; mailed by the Japanese Patent Office dated Apr. 27, 2021.

Office Action issued in JP 2020-509368; mailed by the Japanese Patent Office dated Mar. 30, 2021.

* cited by examiner

IMAGE ENCODING DEVICE, IMAGE DECODING DEVICE AND PROGRAM

TECHNICAL FIELD

The present invention relates to an image encoding device, an image decoding device and a program.

BACKGROUND ART

A method is known in the art in which an encoding device which encodes a target image (image block), performs motion compensation prediction using a plurality of reference images, generates a prediction image corresponding to the target image, and performs an orthogonal transform and quantization of a prediction residual indicating a difference in a pixel unit between the target image and the prediction image.

Further, the image encoding device entropy encodes quantized transform coefficients obtained through the orthogonal transform and the quantization and restores the prediction residual by performing inverse quantization and an inverse orthogonal transform of the quantized transform coefficients. The image encoding device then reconstructs the target image by synthesizing the restored prediction residual and the prediction image and uses the reconstructed image in subsequent prediction.

Meanwhile, an image decoding device decodes the entropy encoded quantized transform coefficients and performs motion compensation prediction using a plurality of reference images to generate the prediction image corresponding to the target image. The image decoding device restores the prediction residual by performing inverse quantization and an inverse orthogonal transform of the quantized transform coefficients and reconstructs the target image by synthesizing the restored prediction residual and the prediction image.

Such an image encoding device and an image decoding device generate the prediction image by, for example, averaging the plurality of reference images in motion compensation prediction in which the plurality of reference images are used (see Non-Patent Literature 1).

CITATION LIST

Non-Patent Literature

Non-Patent Literature 1: Recommendation ITU-T H.265, (December 2016), "High efficiency video coding", International Telecommunication Union

SUMMARY OF INVENTION

In a case where there is a portion where a degree of similarity between a plurality of reference images used to generate a prediction image is significantly low, accuracy of the prediction image (that is, prediction accuracy) at the portion becomes lower, and a prediction residual at the portion becomes greater than that in other portions.

Orthogonal transform of the prediction residual between images including a portion with a great prediction residual and a portion with a small prediction residual inhibits energy from being compacted on low frequency components and lowers degree of energy compaction of transform coefficients. If high frequency components of such transform coefficients are roughly quantized, transform coefficients in the high frequency components degrade. Such degradation of the transform coefficients propagates to the whole of the image (block) through inverse quantization and inverse orthogonal transform.

If the target image block is reconstructed by synthesizing the restored prediction residual which degrades in this manner with the prediction image, degradation of image quality also propagates to a portion where prediction has been performed with high accuracy. In other words, there is a problem that, as a result of influence of quantization of the orthogonal transform coefficients propagating to a portion where prediction has been performed with high accuracy, image quality degrades due to a portion where prediction has been performed with low accuracy, which results in degradation of encoding efficiency.

It is therefore an object of the present invention to provide an image encoding device, an image decoding device and a program which are capable of improving encoding efficiency in a case where prediction is performed using a plurality of reference images.

Note that while a prediction technique of performing prediction using a plurality of reference images is typified by bi-prediction in motion compensation prediction, the prediction technique is not limited to the bi-prediction. For example, a similar approach can be also applied in a case where a prediction image is generated with reference to a plurality of images, such as an intra block copy mode (IntraBC mode) of an image used in an HEVC coding scheme.

An image encoding device according to a first feature encodes a target image. The image encoding device includes a predictor configured to generate a prediction image corresponding to the target image by performing prediction (bidirectional motion compensation prediction as a typical example of the prediction method) using a plurality of reference images, and an evaluator configured to evaluate prediction accuracy of the prediction image by calculating a degree of similarity between the plurality of reference images.

For example, such an image encoding device can estimate a portion with a greater prediction residual and a portion with a smaller prediction residual by evaluating prediction accuracy of the prediction image for each image portion, so that it is possible to efficiently suppress degradation of image quality. It is therefore possible to provide an image encoding device which can improve encoding efficiency in a case where prediction is performed using a plurality of reference images.

Note that any prediction scheme can be utilized if the predictor performs prediction using a plurality of reference images. While typical examples of the prediction method can include bidirectional motion compensation prediction, prediction may be performed using an intra block copy mode (IntraBC mode) used in an HEVC scheme.

An image decoding device according to a second feature decodes a target image. The image decoding device includes a predictor configured to generate a prediction image corresponding to the target image by performing prediction (bidirectional motion compensation prediction as a typical example of the prediction method) using a plurality of reference images, and an evaluator configured to evaluate prediction accuracy of the prediction image by calculating a degree of similarity between the plurality of reference images.

For example, the image decoding device can estimate a portion with a greater prediction residual and a portion with a smaller prediction residual by evaluating prediction accuracy of the prediction image for each image portion, so that it is possible to efficiently suppress degradation of image quality. It is therefore possible to provide an image decoding device which can improve encoding efficiency in a case where prediction is performed using a plurality of reference images.

A program according to a third feature is a program for causing a computer to function as the image encoding device according to the first feature.

A program according to a fourth feature is a program for causing a computer to function as the image decoding device according to the second feature.

DESCRIPTION OF EMBODIMENTS

Figure 1:
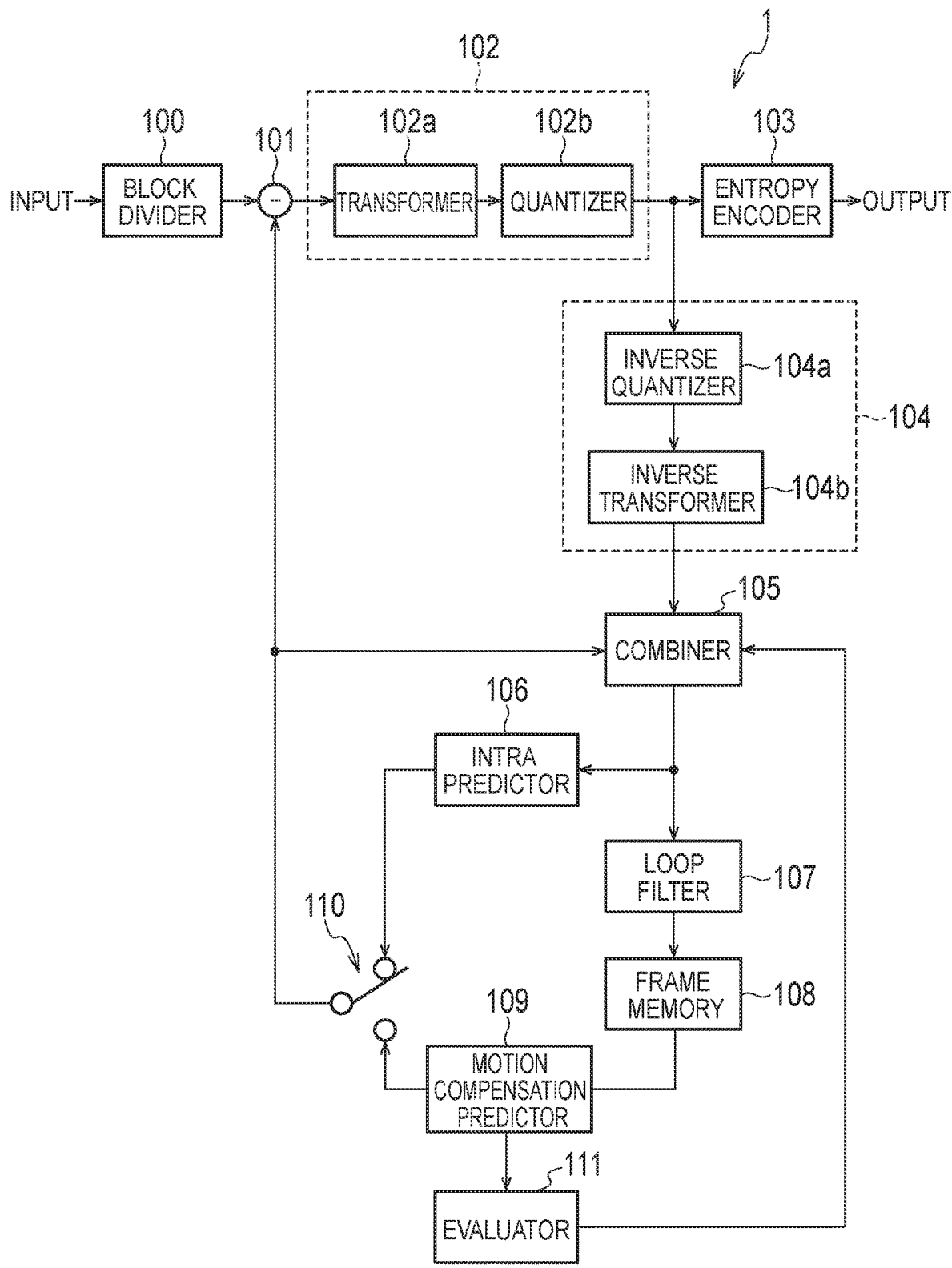
FIG. 1 illustrates a configuration of an image encoding device according to a first embodiment.

An image encoding device and an image decoding device according to embodiments will be described with reference to the drawings. The image encoding device and the image decoding device according to the embodiments encode and decode a moving image typified by MPEG. The same or similar reference numerals will be assigned to the same or similar portions in the following description of the drawings.

1. First Embodiment

An image encoding device and an image decoding device according to a first embodiment will be described.

1.1. Configuration of Image Encoding Device

FIG. 1 illustrates a configuration of an image encoding device 1 according to the first embodiment. As illustrated in FIG. 1, the image encoding device 1 includes a block divider 100, a subtractor 101, a transformer 102a, a quantizer 102b, an entropy encoder 103, an inverse quantizer 104a, an inverse transformer 104b, a combiner 105, an intra predictor 106, a loop filter 107, a frame memory 108, a motion compensation predictor 109, a switcher 110, and an evaluator 111.

The block divider 100 divides an input image which is in a frame (or picture) unit into blocks which are small areas, and outputs image blocks to the subtractor 101 (and the motion compensation predictor 109). A size of the image block is, for example, 32×32 pixels, 16×16 pixels, 8×8 pixels, 4×4 pixels, or the like. The image block which is a unit of encoding to be performed by the image encoding device 1 and a unit of decoding to be performed by the image decoding device 2, will be referred to as a target image block.

The subtractor 101 calculates a prediction residual indicating a difference in a pixel unit between the target image block input from the block divider 100 and a prediction image (prediction image block) corresponding to the target image block. Specifically, the subtractor 101 calculates the prediction residual by subtracting each pixel value of the prediction image from each pixel value of the encoding target block, and outputs the calculated prediction residual to the transformer 102a. Note that the prediction image is input to the subtractor 101 from the intra predictor 106 or the motion compensation predictor 109 which will be described later via the switcher 110.

The transformer 102a and the quantizer 102b configure a transformer/quantizer 102 which performs orthogonal transform processing and quantization processing in a block unit.

The transformer 102a calculates transform coefficients by performing an orthogonal transform of the prediction residual input from the subtractor 101 and outputs the calculated transform coefficients to the quantizer 102b. The orthogonal transform includes, for example, discrete cosine transform (DCT), discrete sine transform (DST), Karhunen-Loeve transform (KLT), and the like.

The quantizer 102b quantizes the transform coefficients input from the transformer 102a using a quantization parameter (Qp) and a quantization matrix to generate quantized transform coefficients. The quantization parameter (Qp) is a parameter to be applied in common to respective transform coefficients within a block and is a parameter which defines roughness of quantization. The quantization matrix is a matrix having a quantization value upon quantization of the respective transform coefficients as an element. The quantizer 102b outputs quantization control information, the generated quantized transform coefficient information, and the like, to the entropy encoder 103 and the inverse quantizer 104a.

The entropy encoder 103 entropy encodes the quantized transform coefficients input from the quantizer 102b, generates encoded data (bit stream) by compressing data, and outputs the encoded data to outside of the image encoding device 1. Huffman codes, context-based adaptive binary arithmetic coding (CABAC), or the like, can be used in entropy encoding. Note that the entropy encoder 103 receives input of information regarding prediction from the intra predictor 106 and the motion compensation predictor 109 and receives input of information regarding filter processing from the loop filter 107. The entropy encoder 103 also entropy encodes these kinds of information.

The inverse quantizer 104a and the inverse transformer 104b configure an inverse quantizer/inverse transformer 104 which performs inverse quantization processing and inverse orthogonal transform processing in a block unit.

The inverse quantizer 104a performs inverse quantization processing corresponding to the quantization processing performed by the quantizer 102b. Specifically, the inverse quantizer 104a restores the transform coefficients by performing inverse quantization of the quantized transform coefficients input from the quantizer 102b using the quantization parameter (Qp) and the quantization matrix, and outputs the restored transform coefficients to the inverse transformer 104b.

The inverse transformer 104b performs inverse orthogonal transform processing corresponding to the orthogonal transform processing performed by the transformer 102a. For example, in a case where the transformer 102a performs discrete cosine transform, the inverse transformer 104b performs inverse discrete cosine transform. The inverse transformer 104b restores the prediction residual by performing an inverse orthogonal transform of the transform coefficients input from the inverse quantizer 104a and outputs the restored prediction residual to the combiner 105.

The combiner 105 combines the restored prediction residual input from the inverse transformer 104b with the prediction image input from the switcher 110 in a pixel unit. The combiner 105 reconstructs the target image block by adding respective pixel values of the restored prediction residual and respective pixel values of the prediction image and outputs the reconstructed image which is the reconstructed target image block to the intra predictor 106 and the loop filter 107.

The intra predictor 106 generates an intra-predicted image by performing intra prediction using the reconstructed image input from the combiner 105 and outputs the intra-predicted image to the switcher 110. Further, the intra predictor 106 outputs information of the selected intra prediction mode, and the like, to the entropy encoder 103.

The loop filter 107 performs filter processing as post processing on the reconstructed image input from the combiner 105 and outputs the reconstructed image subjected to the filter processing to the frame memory 108. Further, the loop filter 107 outputs information regarding the filter processing to the entropy encoder 103. The filter processing includes deblocking filter processing and sample adaptive offset processing. The deblocking filter processing is processing for reducing signal degradation due to processing in a block unit and is processing of smoothing a gap of signals at a boundary portion between a block and an adjacent block. This deblocking filter processing controls strength (filter strength) of the deblocking filter processing using a signal gap at the boundary portion and a quantization parameter indicating a degree of quantization. Meanwhile, the sample adaptive offset processing is filter processing for improving image quality employed in, for example, HEVC (see Non-Patent Literature 1) and is processing of categorizing respective pixels using relative relationship between a pixel and an adjacent pixel within the block, calculating an offset value for improving image quality for each category, and uniformly providing offset values to respective pixels belonging to the same category. Since stronger filter processing is applied as the offset value is greater, the offset value can be regarded as a value which defines filter strength of the sample adaptive offset processing.

The frame memory 108 stores the reconstructed image input from the loop filter 107 in a frame unit.

The motion compensation predictor 109 performs inter prediction using one or more reconstructed images stored in the frame memory 108 as reference images. Specifically, the motion compensation predictor 109 calculates a motion vector using an approach such as block matching, generates a motion compensation prediction image based on the motion vector, and outputs the motion compensation prediction image to the switcher 110. Further, the motion compensation predictor 109 outputs information regarding the motion vector to the entropy encoder 103.

The switcher 110 switches between the intra-predicted image input from the intra predictor 106 and the motion compensation prediction image input from the motion compensation predictor 109, and outputs the prediction image (the intra-predicted image or the motion compensation prediction image) to the subtractor 101 and the combiner 105.

The evaluator 111 calculates a degree of similarity between the plurality of reference images to be used for prediction for each image portion including one or more pixels in a case where the motion compensation predictor 109 performs motion compensation prediction using the plurality of reference images, evaluates prediction accuracy of the prediction image for each image portion using the degree of similarity, and outputs information of the evaluation result to the combiner 105.

An example will be described where, in the present embodiment, the evaluator 111 calculates a degree of similarity between the plurality of reference images to be used for prediction in a unit of one pixel and evaluates prediction accuracy of the prediction image in a unit of one pixel. Note that, while not illustrated in the present embodiment, in a case of intra prediction (for example, an intra block copy mode), or the like, using a plurality of reference images, in a case where the intra predictor 106 performs prediction using a plurality of reference images, the evaluator 111 calculates a degree of similarity between the plurality of reference images, evaluates prediction accuracy of the prediction image in a pixel unit and outputs this evaluation result to the combiner 105. The combiner 105 controls the restored prediction residual to be combined with the prediction image in a pixel unit based on the result of evaluation by the evaluator 111. The evaluator 111 and the combiner 105 will be described in detail later.

1.2. Configuration of Image Decoding Device

Figure 2:
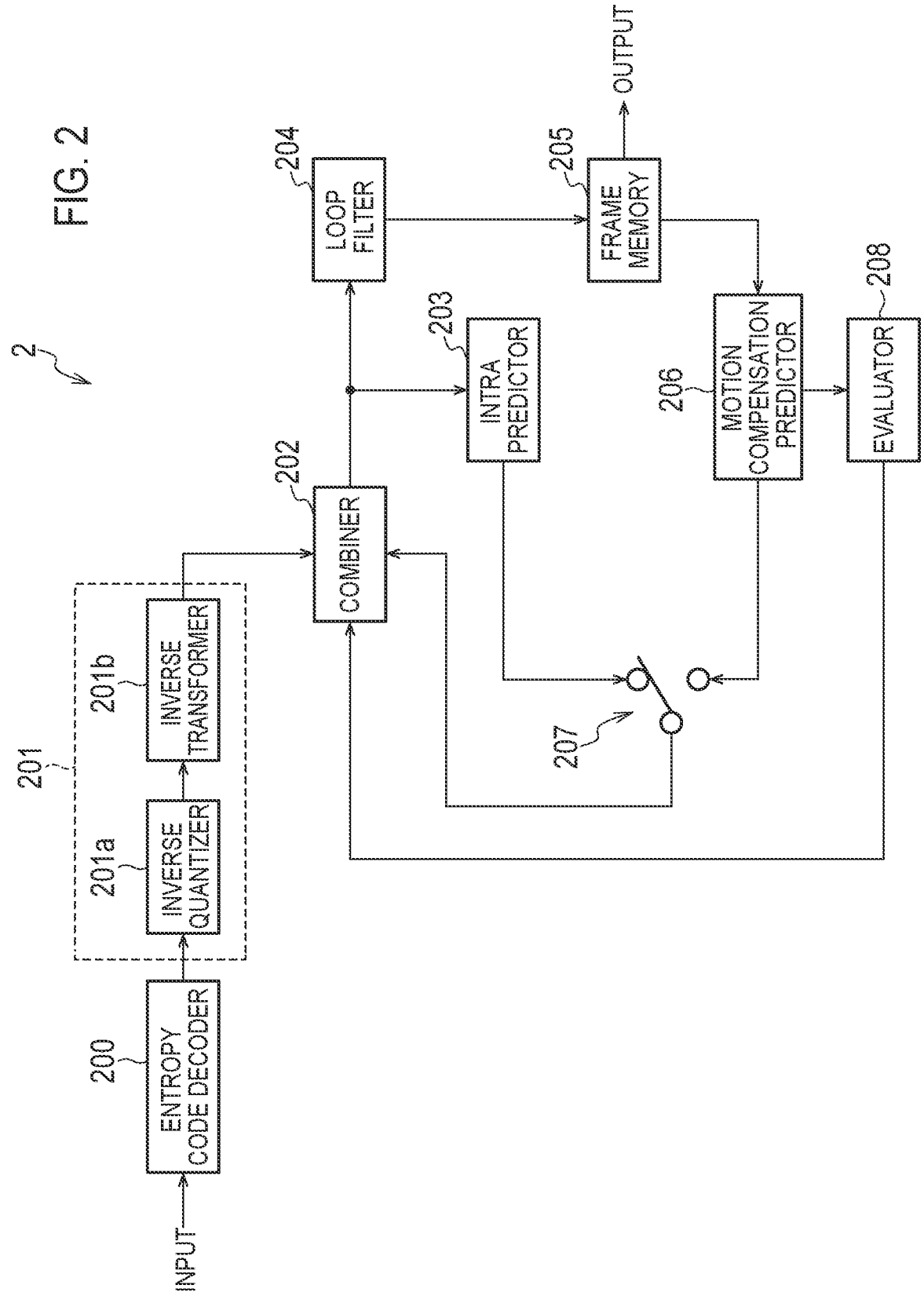
FIG. 2 illustrates a configuration of an image decoding device according to the first embodiment.

FIG. 2 illustrates a configuration of an image decoding device 2 according to the first embodiment. As illustrated in FIG. 2, the image decoding device 2 includes an entropy code decoder 200, an inverse quantizer 201a, an inverse transformer 201b, a combiner 202, an intra predictor 203, a loop filter 204, a frame memory 205, a motion compensation predictor 206, a switcher 207, and an evaluator 208.

The entropy code decoder 200 decodes the encoded data generated by the encoding device 1 and outputs the quantized transform coefficients to the inverse quantizer 201a.

Further, the entropy code decoder 200 decodes the encoded data to acquire information regarding prediction (intra prediction and motion compensation prediction) and information regarding the filter processing, outputs the information regarding the prediction to the intra predictor 203 and the motion compensation predictor 206, and outputs the information regarding the filter processing to the loop filter 204.

The inverse quantizer 201a and the inverse transformer 201b configure an inverse quantizer/inverse transformer 201 which performs inverse quantization processing and inverse orthogonal transform processing in a block unit.

The inverse quantizer 201a performs inverse quantization processing corresponding to the quantization processing performed by the quantizer 102b of the image encoding device 1. The inverse quantizer 201a restores the transform coefficients by performing inverse quantization of the quantized transform coefficients input from the entropy code decoder 200 using the quantization parameter (Qp) and the quantization matrix, and outputs the restored transform coefficients to the inverse transformer 201b.

The inverse transformer 201b performs inverse orthogonal transform processing corresponding to the orthogonal transform processing performed by the transformer 102a of the image encoding device 1. The inverse transformer 201b restores the prediction residual by performing an inverse orthogonal transform of the transform coefficients input from the inverse quantizer 201a and outputs the restored prediction residual to the combiner 202.

The combiner 202 reconstructs the original target image block by combining the prediction residual input from the inverse transformer 201b with the prediction image input from the switcher 207 in a pixel unit, and outputs the reconstructed image to the intra predictor 203 and the loop filter 204.

The intra predictor 203 generates an intra-predicted image by performing intra prediction in accordance with the intra prediction information input from the entropy code decoder 200 with reference to the reconstructed encoded block image input from the combiner 202 and outputs the intra-predicted image to the switcher 207.

The loop filter 204 performs filter processing similar to the filter processing performed by the loop filter 107 of the image encoding device 1 on the reconstructed image input from the combiner 202 based on the filter processing information input from the entropy code decoder 200 and outputs the reconstructed image subjected to the filter processing to the frame memory 205.

The frame memory 205 stores the reconstructed image input from the loop filter 204 in a frame unit. The frame memory 205 outputs the stored reconstructed images to outside of the image decoding device 2 in display order.

The motion compensation predictor 206 generates the motion compensation prediction image by performing motion compensation prediction (inter prediction) in accordance with the motion vector information input from the entropy code decoder 200 using one or more reconstructed images stored in the frame memory 205 as reference images, and outputs the motion compensation prediction image to the switcher 207.

The switcher 207 switches between the intra-predicted image input from the intra predictor 203 and the motion compensation prediction image input from the motion compensation predictor 206 and outputs the prediction image (the intra-predicted image or the motion compensation prediction image) to the combiner 202.

The evaluator 208 performs operation similar to that performed at the evaluator 111 of the image encoding device 1. Specifically, in a case where the motion compensation predictor 206 performs motion compensation prediction using a plurality of reference images, the evaluator 208 evaluates prediction accuracy of the prediction image in a pixel unit by calculating a degree of similarity between the plurality of reference images in a pixel unit and outputs information of the evaluation result to the combiner 202. The combiner 202 controls the restored prediction residual to be combined with the prediction image in a pixel unit based on the result of evaluation by the evaluator 208.

1.3. Motion Compensation Prediction

Figure 3:
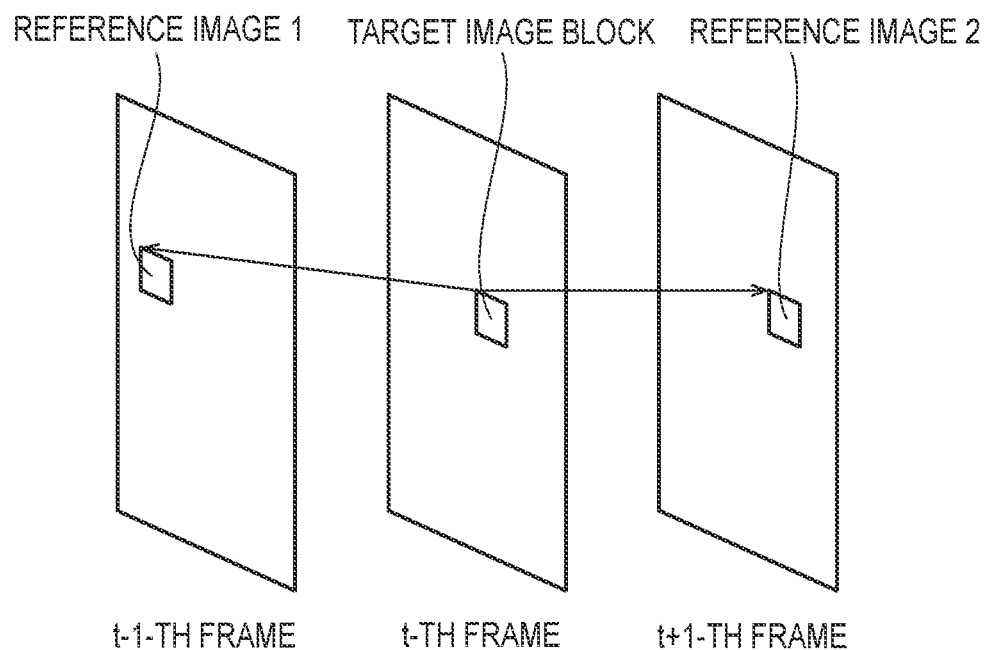
FIG. 3 illustrates an example of motion compensation prediction.
Figure 4:
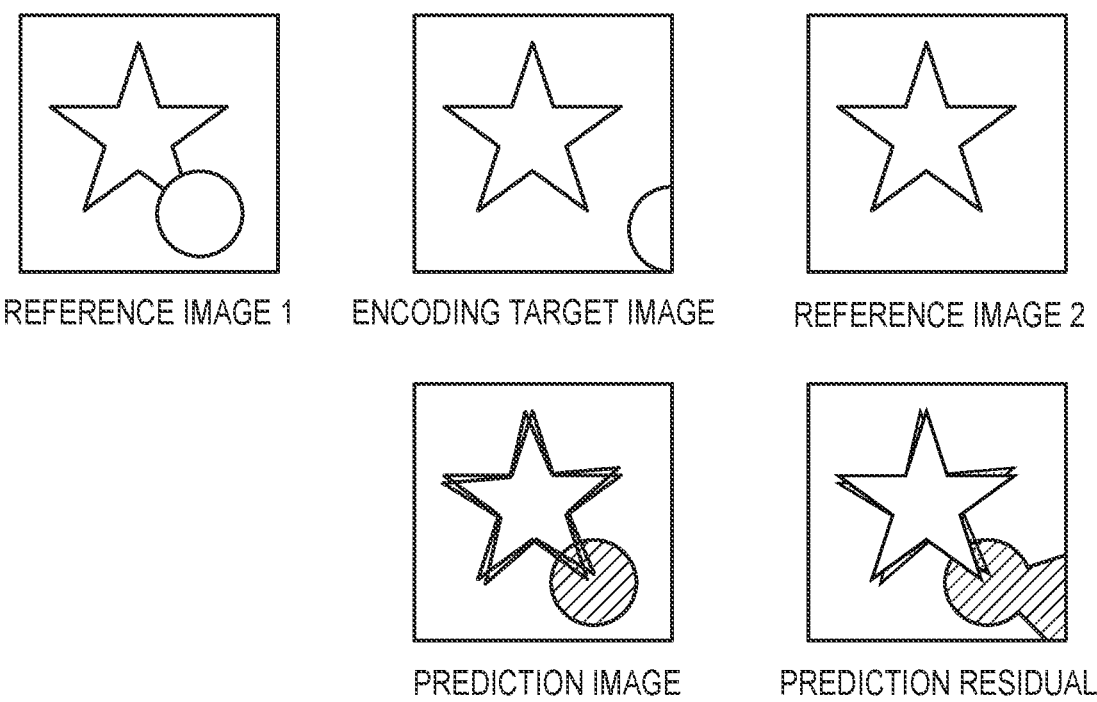
FIG. 4 illustrates an example of a prediction image generated through motion compensation prediction.

FIG. 3 illustrates an example of motion compensation prediction. FIG. 4 illustrates an example of the prediction image generated through motion compensation prediction. A case will be described as a simple example of the motion compensation prediction where bi-prediction used in HEVC, particularly, forward direction and backward prediction (bi-directional prediction) are used.

As illustrated in FIG. 3, the motion compensation prediction is performed with reference to temporally preceding and subsequent frames with respect to a target frame (current frame). In the example in FIG. 3, motion compensation prediction of a block in an image of a t-th frame is performed with reference to a t−1-th frame and a t+1-th frame. In the motion compensation, portions (blocks) within the t−1-th reference frame and the t+1-th reference frame, which are similar to the target image block are detected from a search range set at a system.

The detected portions are reference images. Information indicating relative positions of the reference images with respect to the target image block indicated with an arrow in the drawing, will be referred to as a motion vector. Information of the motion vector is entropy encoded along with the frame information of the reference images at the image encoding device 1. Meanwhile, the image decoding device 2 detects the reference images based on the information of the motion vector generated by the image encoding device 1.

As illustrated in FIG. 3 and FIG. 4, reference images 1 and 2 detected through motion compensation are similar partial images aligned with the target image block, within the frames to be referred to, and are thus regarded as images similar to the target image block (encoding target image). In the example in FIG. 4, the target image block includes a design of a star and a design of a partial circle. The reference image 1 includes a design of a star and a design of the entire circle. The reference image 2 includes a design of a star, but does not include a design of a circle.

The prediction image is generated from such reference images 1 and 2. Note that, in the prediction processing, the prediction image having features of the respective reference images is typically generated by averaging the reference images 1 and 2 which have different features but are partially similar to each other. However, the prediction image may be generated also using more advanced processing, for example, signal enhancement processing using a low-pass filter, a high-pass filter, or the like. Here, if the prediction image is generated by averaging the reference image 1 which includes a design of a circle and the reference image 2 which does not include a design of a circle, signals of the design of the circle in the prediction image decreases by half compared to those of the reference image 1.

A difference between the prediction image obtained from the reference images 1 and 2 and the target image block (encoding target image) is the prediction residual. The prediction residual indicated in FIG. 4 indicates that a large difference exists only at a portion where edges of the stars in the designs are misaligned and at a portion where the circles in the designs are misaligned (shaded portions), and prediction is performed with high accuracy and has less differences at other portions (a difference does not exist in the example in FIG. 4).

A difference does not exist (at a portion which does not correspond to edges of the stars in the designs and at a background portion) at portions where a degree of similarity between the reference image 1 and the reference image 2 is high, and where prediction is performed with high accuracy. Meanwhile, a large difference exists at portions unique to the respective reference images, that is, at portions where the degree of similarity between the reference image 1 and the reference image 2 is significantly low. Thus, it can be known that prediction accuracy is low and a large difference (residual) exists at portions where the degree of similarity between the reference image 1 and the reference image 2 is significantly low.

If the transform coefficients degrade due to the prediction residual including a portion with a large difference and a portion with no difference being orthogonally transformed and quantized, such degradation of the transform coefficients propagates to the whole of the image (block) through inverse quantization and inverse orthogonal transform.

Then, if the target image block is reconstructed by combining the prediction residual (restored prediction residual) restored by inverse quantization and inverse orthogonal transform with the prediction image, degradation of image quality also propagates to portions where prediction has been performed with high accuracy such as a portion which does not correspond to the edges of the stars in the designs and the background portion illustrated in FIG. 4.

1.4. Evaluator and Combiner

The evaluator 111 of the image encoding device 1 evaluates prediction accuracy of the prediction image in a pixel unit by calculating a degree of similarity between the plurality of reference images in a pixel unit. The combiner 105 then controls the restored prediction residual to be combined with the prediction image in a pixel unit based on the result of evaluation by the evaluator 111.

In a similar manner, the evaluator 208 of the image decoding device 2 evaluates prediction accuracy of the prediction image in a pixel unit by calculating a degree of similarity between the plurality of reference images in a pixel unit. The combiner 202 then controls the restored prediction residual to be combined with the prediction image in a pixel unit based on the result of evaluation by the evaluator 208.

By this means, it becomes possible to suppress the restored prediction residual to be combined with the prediction image for portions where prediction is performed with high accuracy, so that it is possible to prevent degradation of image quality in the restored prediction residual from propagating to the portions where prediction is performed with high accuracy. It is therefore possible to improve image quality and improve encoding efficiency in a case where motion compensation prediction is performed using a plurality of reference images.

Figure 5:
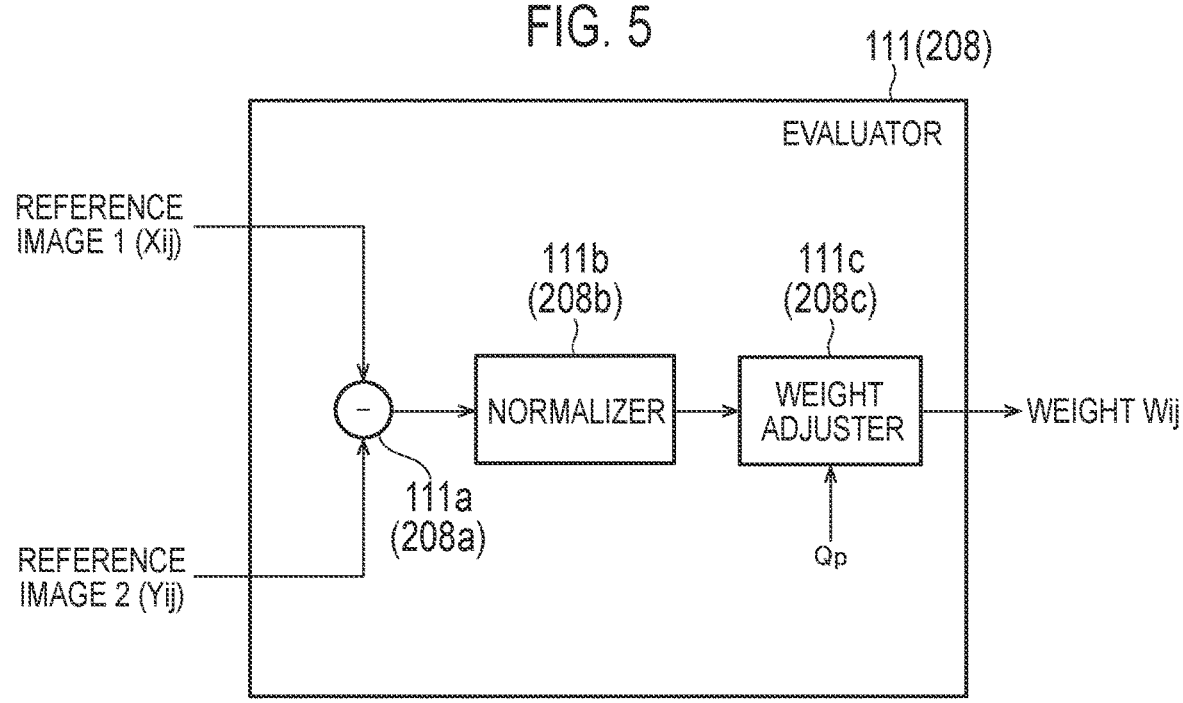
FIG. 5 illustrates an example of a configuration of an evaluator.

FIG. 5 illustrates an example of a configuration of the evaluator 111 at the image encoding device 1. As illustrated in FIG. 5, the evaluator 111 includes a difference calculator (subtractor) 111a, a normalizer 111b, and a weight adjuster 111c.

The difference calculator 111a calculates an absolute value of a difference value between the reference image 1 and the reference image 2 in a pixel unit and outputs the calculated absolute value of the difference value to the normalizer 111b. The absolute value of the difference value is an example of a value indicating the degree of similarity. A smaller absolute value of the difference value indicates a higher degree of similarity, while a greater absolute value of the difference value indicates a lower degree of similarity. The difference calculator 111a may calculate the absolute value of the difference value after performing filter processing on the respective reference images. The difference calculator 111a may calculate statistics such as a square error and may use the statistics as the degree of similarity.

The normalizer 111b normalizes a difference value of each pixel input from the difference calculator 111a with an absolute value of the difference value of the pixel at which the absolute value of the difference value becomes a maximum within the block (that is, a maximum value of the absolute value of the difference value within the block) and outputs the normalized difference value which is the normalized absolute value of the difference value to the weight adjuster 111c. In the first embodiment, the normalized difference value is used as a weight for weighting the restored prediction residual to be combined with the prediction image at the combiner 105 in a pixel unit.

The weight adjuster 111c adjusts the normalized difference value (weight) input from the normalizer 111b based on the quantization parameter (Qp) which defines roughness of quantization and outputs this weight. The weight adjuster 111c can weight the restored prediction residual in view of a degradation degree of the restored prediction residual, which becomes higher as quantization is rougher, by adjusting the normalized difference value (weight) based on the quantization parameter (Qp).

A weight Wij of each pixel (ij) output from the evaluator 111 can be expressed with, for example, the following expression (1).

$$Wij=(abs(Xij-Yij)/maxD \times Scale(Qp)) \qquad (1)$$

In expression (1), Xij is a pixel value of the pixel ij of the reference image 1, Yij is a pixel value of the pixel ij of the reference image 2, and abs is a function for obtaining an absolute value. The difference calculator 111a illustrated in FIG. 5 outputs abs(Xij−Yij).

Further, in expression (1), maxD is a maximum value of the difference value abs(Xij−Yij) within the block. While it is necessary to obtain difference values for all pixels within the block to obtain maxD, it is also possible to use a maximum value, or the like, of an adjacent block which has already been subjected to encoding processing as a substitute for the difference values for all the pixels within the block to skip this processing, and, for example, in a case where there is a value equal to or greater than the maximum value, it is also possible to normalize maxD by performing clipping with the maximum value which has been used. Alternatively, it is also possible to obtain maxD from the quantization parameter (Qp) using a table which defines correspondence relationship between the quantization parameter (Qp) and maxD. Alternatively, it is also possible to use a fixed value defined in specifications in advance as maxD. The normalizer 111b outputs abs(Xij−Yij)/maxD.

Further, in expression (1), Scale(Qp) is a coefficient to be multiplied in accordance with the quantization parameter (Qp). Scale(Qp) is designed so as to approach 1.0 in a case where Qp is greater and approach 0 in a case where Qp is smaller, and a degree of approach is adjusted by a system.

Alternatively, it is also possible to use a fixed value defined in specifications in advance as Scale(Qp). Further, to simplify the processing, it is also possible to set a fixed value such as 1.0 designed in accordance with the system as Scale(QP).

The weight adjuster 111c outputs abs(Xij−Yij)/maxD× Scale(Qp) as the weight Wij. Alternatively, the weight adjuster 111c may output a weight adjusted with a sensitivity function designed in accordance with the system as this Wij. For example, sensitivity may be adjusted not only with Wij=Clip(wij, 1.0, 0.0) in abs(Xij−Yij)/maxD×Scale(Qp) =wij, but also with Wij=Clip(wij+offset, 1.0, 0.0) by adding an offset in accordance with control information such as, for example, QP. Note that Clip(x, max, min) indicates processing of performing clipping with max in a case where x exceeds max, and performing clipping with min in a case where x falls below min.

The weight Wij calculated in this manner becomes a value within a range from 0 to 1.0. Basically, the weight Wij approaches 1.0 in a case where the absolute value of the difference value of the pixel ij among the reference values is greater (that is, prediction accuracy is lower), and approaches 0 in a case where the absolute value of the difference value of the pixel ij among the reference images is smaller (that is, prediction accuracy is higher). The evaluator 111 outputs map information including the weights Wij of respective pixels ij within the block to the combiner 105 in a block unit.

Note that the evaluator 111 performs evaluation (calculates the weight Wij) only in a case where motion compensation prediction using a plurality of reference images is applied, and uniformly sets 1.0 as the weight Wij without performing evaluation in other modes, for example, in unidirectional prediction or in intra prediction processing in which a plurality of reference images are not used.

Figure 6:
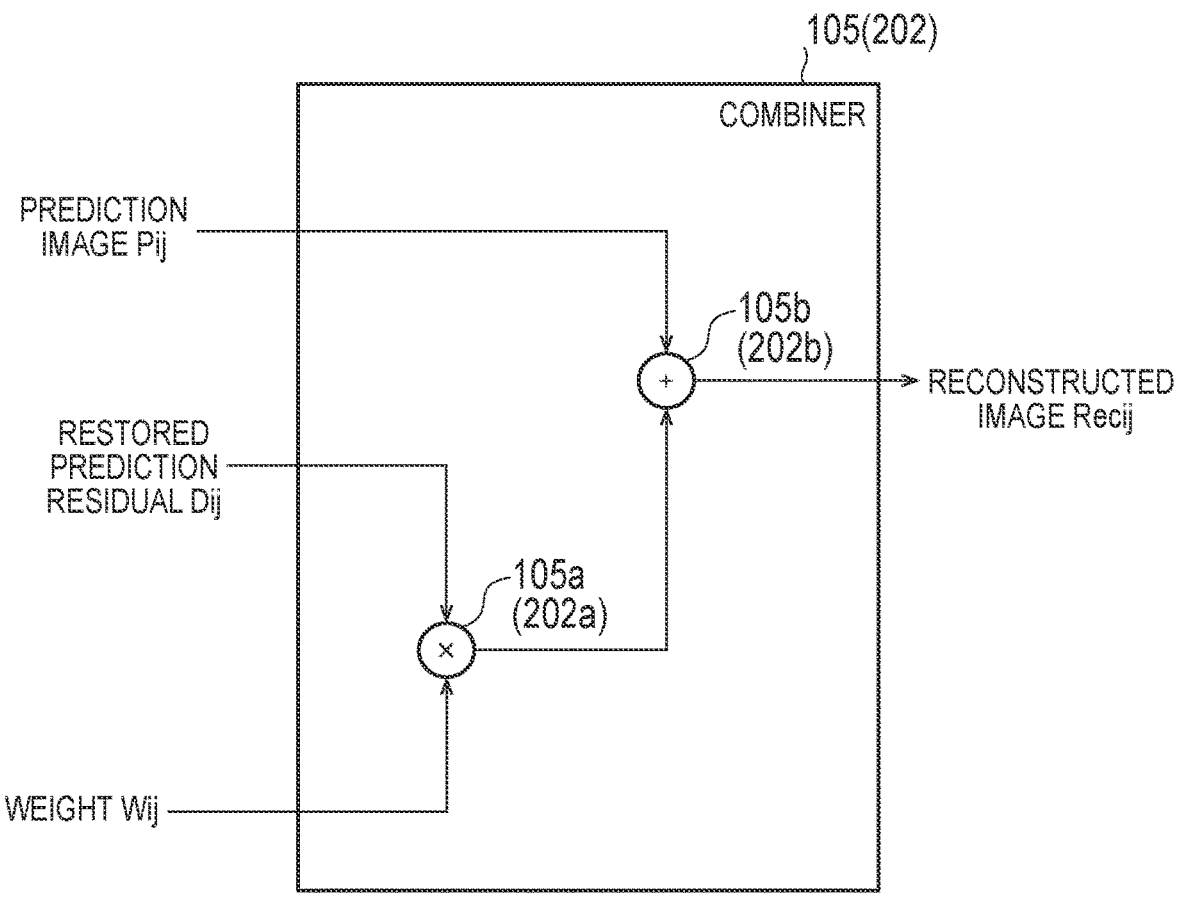
FIG. 6 illustrates an example of a configuration of a combiner.

FIG. 6 illustrates an example of a configuration of the combiner 105 in the image encoding device 1. As illustrated in FIG. 6, the combiner 105 includes a weight applier (multiplier) 105a and an adder 105b.

The weight applier 105a applies a weight to the restored prediction residual input from the inverse transformer 104b in a pixel unit using the map information (weight Wij) input from the evaluator 111 and outputs the weighted restored prediction residual to the adder 105b.

The adder 105b generates the reconstructed image by adding the weighted restored prediction residual input from the weight applier 105a to the prediction image input from the motion compensation predictor 109 via the switcher 110 in a pixel unit, and outputs the generated reconstructed image.

Such processing of the combiner 105 can be expressed with, for example, the following expression (2).

$$Recij = Dij \times Wij + Pij \quad (2)$$

In expression (2), Recij is a pixel value of the pixel ij in the reconstructed image, Dij is a pixel value of the pixel ij in the restored prediction residual, Wij is a weight of the pixel ij in the map information, and Pij is a pixel value of the pixel ij in the prediction image.

Note that the combiner 105 performs weighting processing only in a case where motion compensation prediction using a plurality of reference images is applied, and does not perform weighting processing in other modes, for example, in unidirectional prediction and intra prediction processing.

Further, while the evaluator 111 and the combiner 105 in the image encoding device 1 have been described, the evaluator 208 and the combiner 202 in the image decoding device 2 are configured in a similar manner to the evaluator 111 and the combiner 105 in the image encoding device 1. Specifically, the evaluator 208 in the image decoding device 2 includes a difference calculator 208a, a normalizer 208b, and a weight adjuster 208c. The combiner 202 in the image decoding device 2 includes a weight applier (multiplier) 202a and an adder 202b.

1.5. Operation of Image Encoding

Figure 7:
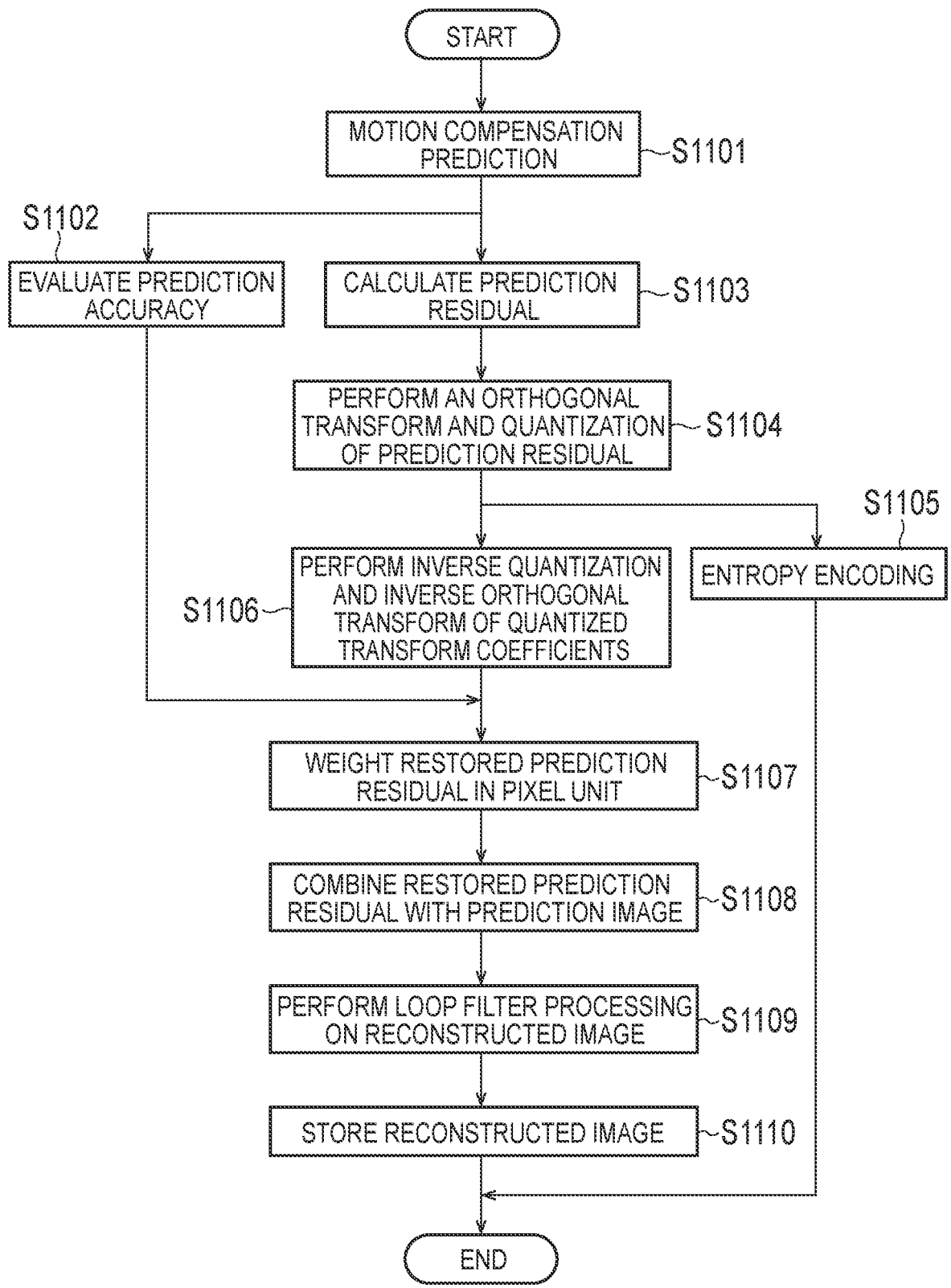
FIG. 7 illustrates processing flow at the image encoding device according to the first embodiment.

FIG. 7 illustrates processing flow at the image encoding device 1 according to the first embodiment.

As illustrated in FIG. 7, in step S1101, the motion compensation predictor 109 predicts a target image block by performing motion compensation prediction using a plurality of reference images to generate a prediction image corresponding to the target image block. The entropy encoder 103 encodes the motion compensation prediction information as part of the encoded data and outputs the encoded data including the motion compensation prediction information.

In step S1102, the evaluator 111 evaluates prediction accuracy of the prediction image in a pixel unit by calculating a degree of similarity between the plurality of reference images in a pixel unit or evaluates the prediction accuracy in a unit of partial image by averaging prediction accuracy of a plurality of pixels, to generate map information including weights for respective pixels or partial images within the block.

In step S1103, the subtractor 101 calculates the prediction residual indicating a difference between the target image block and the prediction image in a pixel unit.

In step S1104, the transformer/quantizer 102 generates quantized transform coefficients by performing an orthogonal transform and quantization of the prediction residual calculated by the subtractor 101.

In step S1105, the entropy encoder 103 entropy encodes the quantized transform coefficients and outputs the encoded data.

In step S1106, the inverse quantizer/inverse transformer 104 restores the prediction residual by performing inverse quantization and an inverse orthogonal transform the quantized transform coefficients to generate the restored prediction residual.

In step S1107, the combiner 105 controls the restored prediction residual to be combined with the prediction image in a pixel unit based on the result (map information) of evaluation by the evaluator 111. Specifically, the combiner 105 performs weighting processing in a pixel unit as described above on the restored prediction residual.

In step S1108, the combiner 105 reconstructs the target image block by combining the weighted restored prediction residual with the prediction image in a pixel unit to generate the reconstructed image.

In step S1109, the loop filter 107 performs filter processing on the reconstructed image. Further, the entropy encoder 103 encodes information regarding the loop filter (such as an offset and category information to which the offset is to be applied) as part of the encoded data and outputs the encoded data including the information regarding the loop filter.

In step S1110, the frame memory 108 stores the reconstructed image subjected to the filter processing in a frame unit.

1.6. Operation of Image Decoding

Figure 8:
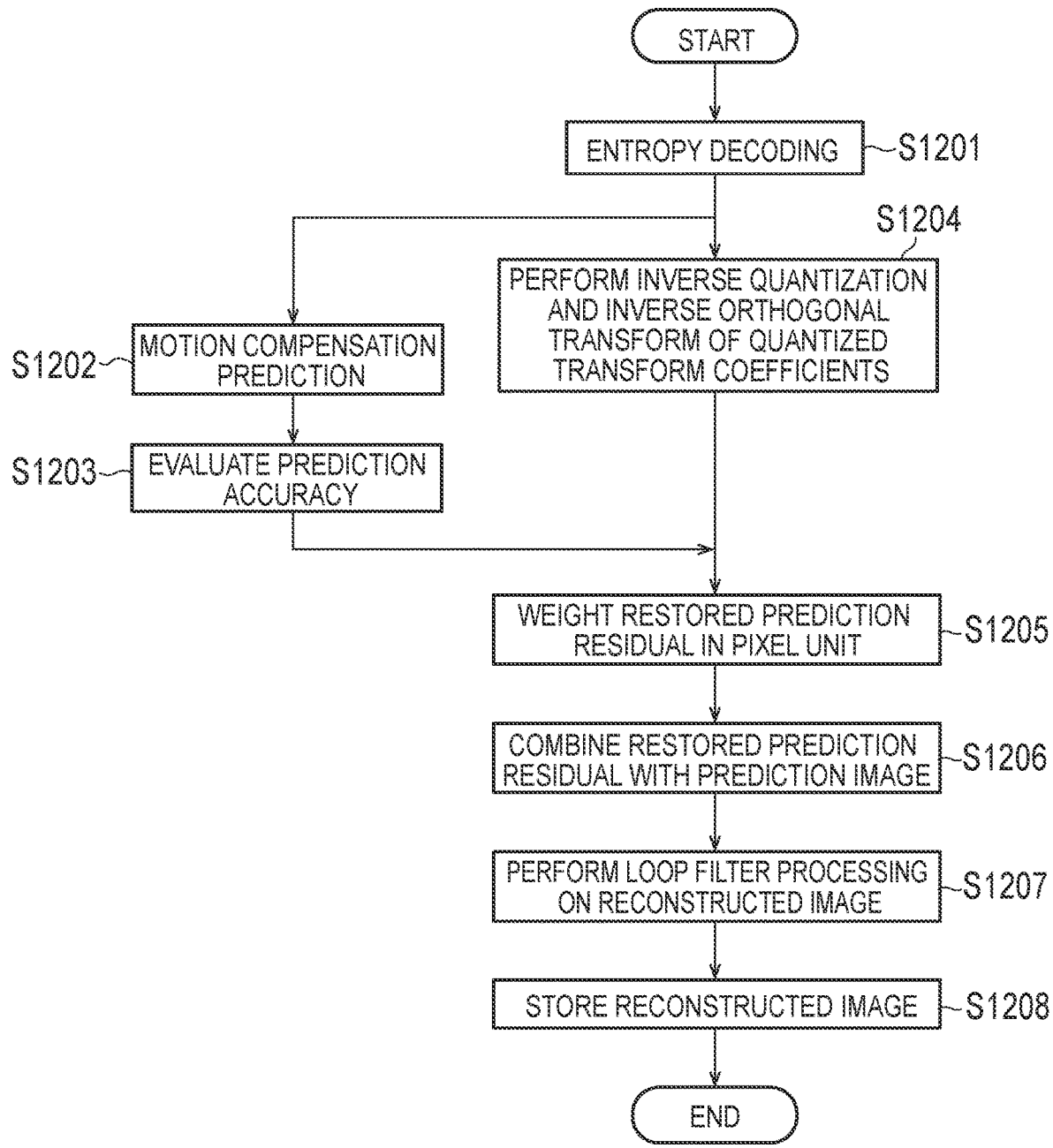
FIG. 8 illustrates processing flow at the image decoding device according to the first embodiment.

FIG. 8 illustrates processing flow at the image decoding device 2 according to the first embodiment.

As illustrated in FIG. 8, in step S1201, the entropy code decoder 200 decodes the encoded data to acquire the quantized transform coefficients, the motion vector information and the information regarding the loop filter.

In step S1202, the motion compensation predictor 206 predicts the target image block by performing motion compensation prediction using a plurality of reference images based on the motion vector information to generate the prediction image corresponding to the target image block.

In step S1203, the evaluator 208 evaluates prediction accuracy of the prediction image in a pixel unit by calculating a degree of similarity between the plurality of reference images in a pixel unit to generate map information including weights for respective pixels or partial images within the block.

In step S1204, the inverse quantizer/inverse transformer 201 restores the prediction residual by performing inverse quantization and an inverse orthogonal transform of the quantized transform coefficients to generate the restored prediction residual.

In step S1205, the combiner 202 controls the restored prediction residual to be combined with the prediction image in a pixel unit based on the result (map information) of evaluation by the evaluator 208. Specifically, the combiner 202 performs weighting processing in a pixel unit as described above on the restored prediction residual.

In step S1206, the combiner 202 reconstructs the target image block by combining the weighted restored prediction residual with the prediction image in a pixel unit to generate the reconstructed image.

In step S1207, the loop filter 204 performs filter processing on the reconstructed image.

In step S1208, the frame memory 205 stores and outputs the reconstructed image subjected to the filter processing in a frame unit.

1.7. Conclusion of the First Embodiment

The evaluator 111 of the image encoding device 1 evaluates prediction accuracy of the prediction image in a pixel unit by calculating a degree of similarity between the plurality of reference images in a pixel unit. The combiner 105 then controls the restored prediction residual to be combined with the prediction image in a pixel unit based on the result of evaluation by the evaluator 111.

The evaluator 208 of the image decoding device 2 evaluates prediction accuracy of the prediction image in a pixel unit by calculating a degree of similarity between the plurality of reference images in a pixel unit. The combiner 202 then controls the restored prediction residual to be combined with the prediction image in a pixel unit based on the result of evaluation by the evaluator 208.

By this means, it becomes possible to suppress the restored prediction residual to be combined with the prediction image for a portion where prediction is performed with high accuracy, so that it is possible to prevent degradation of image quality in the restored prediction residual from propagating to the portion where prediction is performed with high accuracy. Consequently, it is possible to improve image quality and improve encoding efficiency in a case where motion compensation prediction is performed using a plurality of reference images.

2. Second Embodiment

An image encoding device and an image decoding device according to a second embodiment, mainly differences from the first embodiment, will be described. While, in the first embodiment, the evaluation result of the prediction accuracy is utilized in signal combining processing, in the second embodiment, the evaluation result of the prediction accuracy is utilized in filter processing.

2.1. Image Encoding Device

Figure 9:
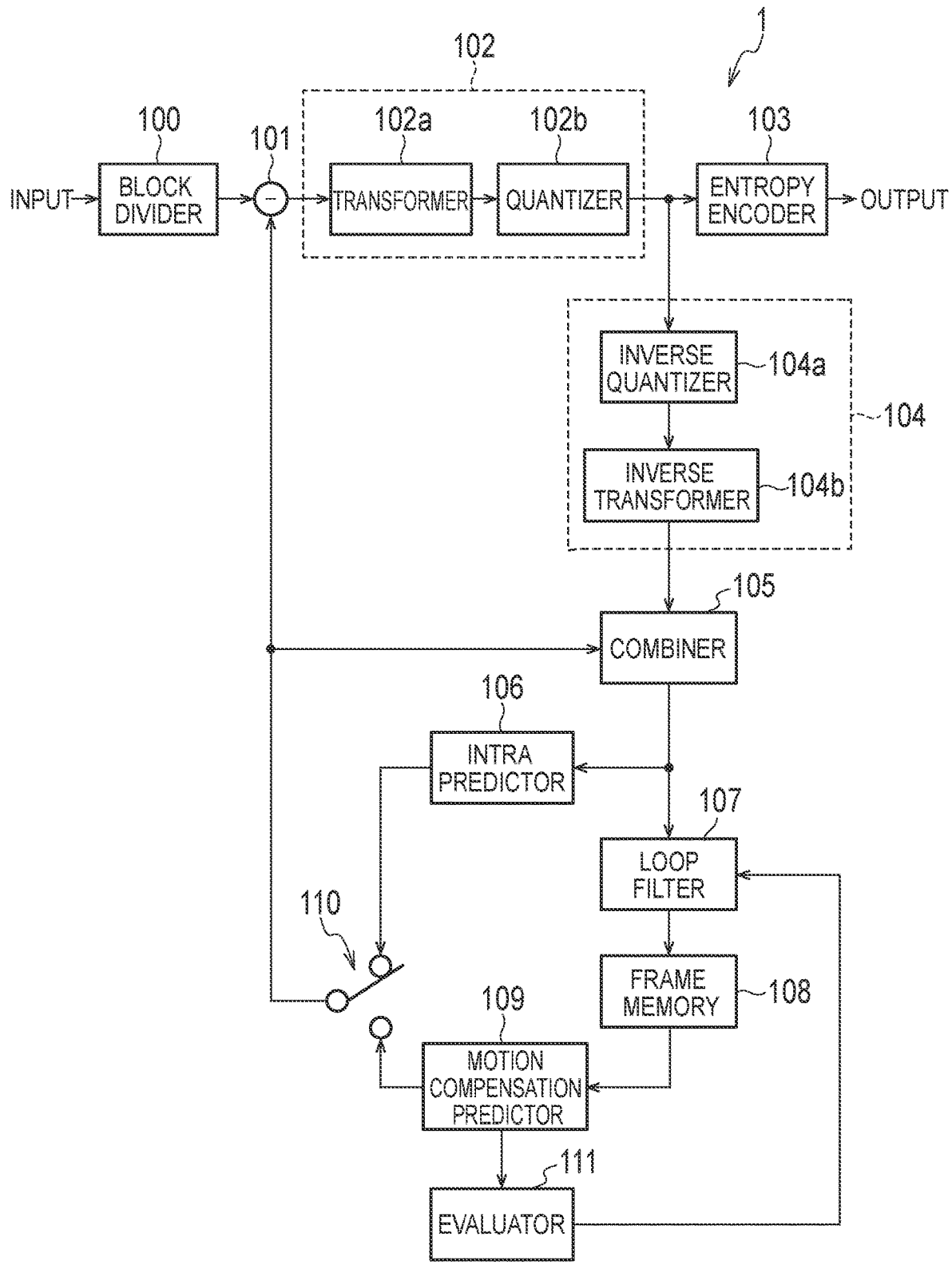
FIG. 9 illustrates a configuration of an image encoding device according to a second embodiment.

FIG. 9 illustrates a configuration of the image encoding device 1 according to the second embodiment. As illustrated in FIG. 9, the evaluator 111 in the second embodiment outputs the evaluation result (map information) to the loop filter 107. Specifically, the evaluator 111 evaluates prediction accuracy of the prediction image in a pixel unit by calculating a degree of similarity between the plurality of reference images in a pixel unit in a similar manner to the first embodiment.

The loop filter 107 controls filter strength in filter processing in a pixel unit based on the result of evaluation by the evaluator 111. The loop filter 107 then performs filter processing (sample adaptive offset processing) by adding an offset value controlled in a pixel unit to the reconstructed image input from the combiner 105 in a pixel unit and outputs the reconstructed image subjected to the filter processing to the frame memory 108.

2.2. Image Decoding Device

Figure 10:
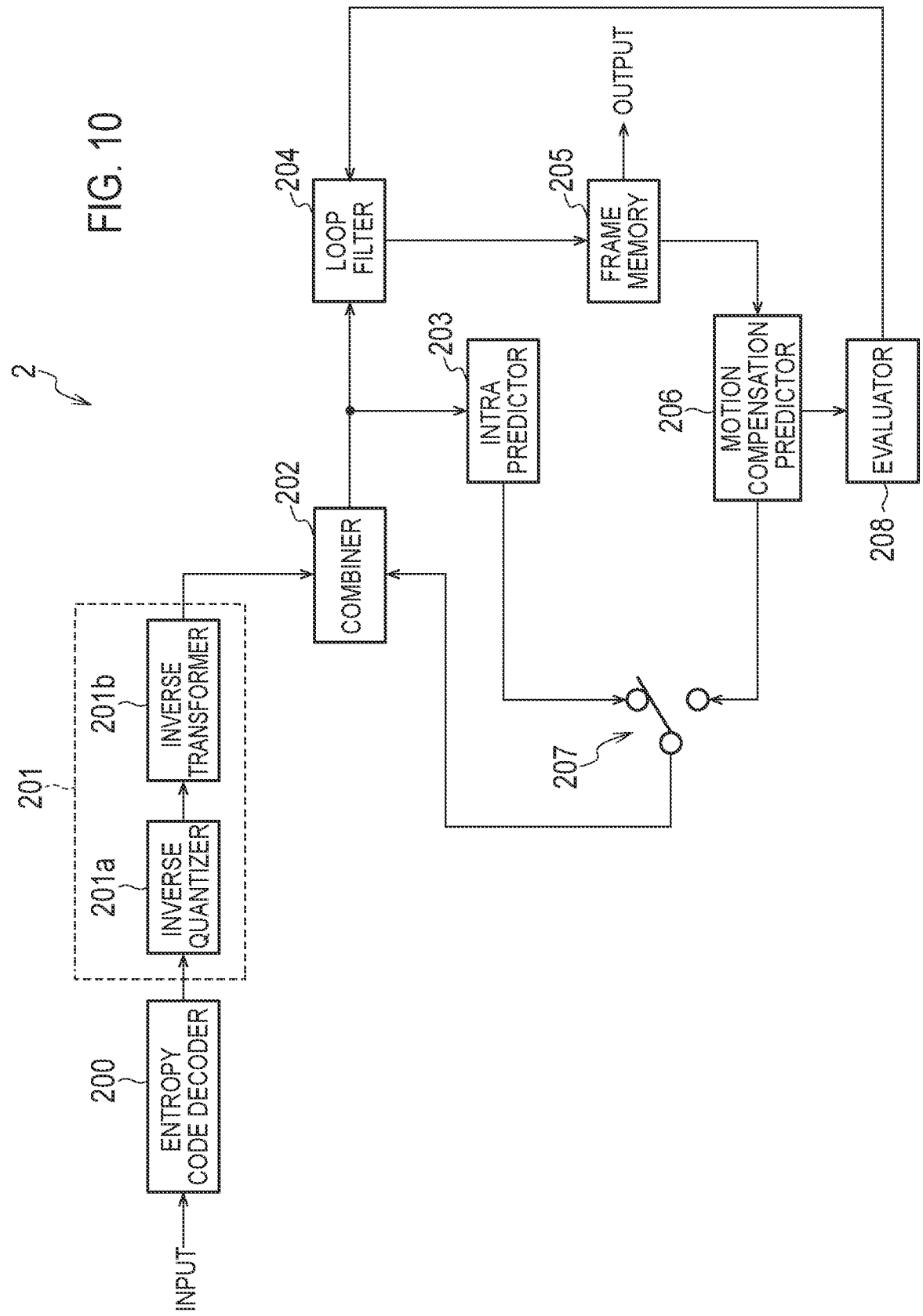
FIG. 10 illustrates a configuration of an image decoding device according to the second embodiment.

FIG. 10 illustrates a configuration of the image decoding device 2 according to the second embodiment. As illustrated in FIG. 10, the evaluator 208 in the second embodiment outputs the evaluation result (map information) to the loop filter 204. Specifically, the evaluator 208 evaluates prediction accuracy of the prediction image in a pixel unit by calculating a degree of similarity between the plurality of reference images in a pixel unit in a similar manner to the first embodiment.

The loop filter 204 controls filter strength in filter processing in a pixel unit based on the result of evaluation by the evaluator 208. The loop filter 204 then performs filter processing (sample adaptive offset processing) by adding an offset value controlled in a pixel unit to the reconstructed image input from the combiner 202 in a pixel unit and outputs the reconstructed image subjected to the filter processing to the frame memory 205.

2.3. Loop Filter

Figure 11:
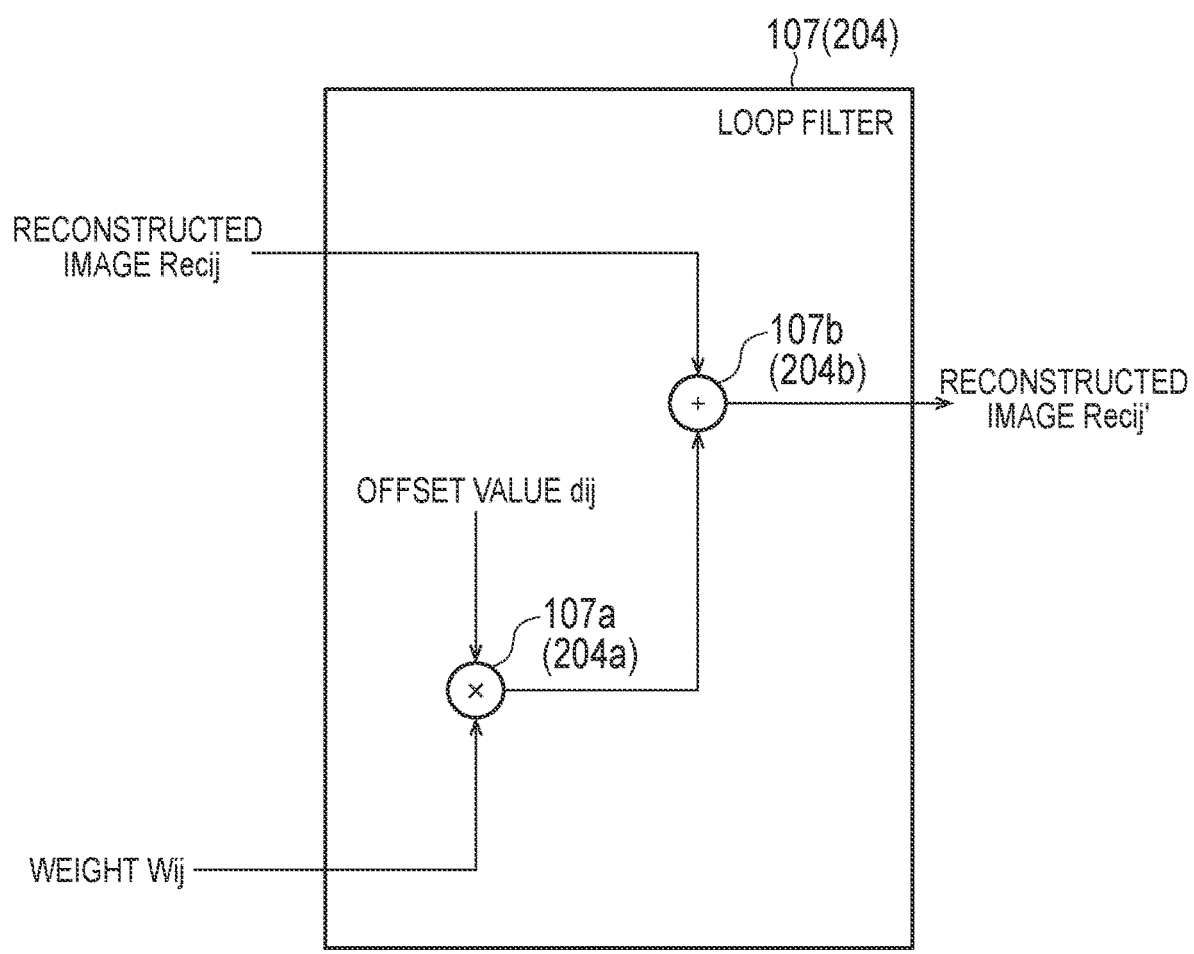
FIG. 11 illustrates an example of a configuration of a loop filter.

FIG. 11 illustrates an example of a configuration of the loop filter 107 in the image encoding device 1. As illustrated in FIG. 11, the loop filter 107 includes a weight applier (multiplier) 107a and an adder 107b.

The weight applier 107a applies a weight to the offset value which defines the filter strength in a pixel unit using the map information (weight Wij) input from the evaluator 111. As the offset value which defines the filter strength, an offset value used in sample adaptive offset processing (see Non-Patent Literature 1) can be used. As described above, in the sample adaptive offset processing, the loop filter 107 categorizes respective pixels in accordance with relative relationship between a pixel and an adjacent pixel within the block and calculates an offset value so as to improve image quality for each category. The weight applier 107a applies a weight to the offset value to be used in the sample adaptive offset processing in a pixel unit and outputs the weighted offset value to the adder 107b.

The adder 107b performs filter processing (sample adaptive offset processing) by adding the weighted offset value input from the weight applier 107a to the reconstructed image input from the combiner 105 in a pixel unit and outputs the reconstructed image subjected to the filter processing.

Such processing of the loop filter 107 can be expressed with, for example, the following expression (3).

$$Recij'=Recij+dij\times Wij \quad (3)$$

In expression (3), Recij' is a pixel value of the pixel ij in the reconstructed image subjected to the filter processing, Recij is a pixel value of the pixel ij in the reconstructed image before the filter processing, dij is an offset value to be added to the pixel ij, and Wij is a weight of the pixel ij in the map information.

Note that the loop filter 107 performs weighting processing based on the map information only in a case where motion compensation prediction using a plurality of reference images is applied, and does not perform weighting processing based on the map information in other modes, for example, in unidirectional prediction and in intra prediction processing.

Further, while the loop filter 107 in the image encoding device 1 has been described, the loop filter 204 in the image decoding device 2 is configured in a similar manner to the loop filter 107 in the image encoding device 1. Specifically, the loop filter 204 in the image decoding device 2 includes a weight applier (multiplier 204a) and an adder 204b.

2.4. Operation of Image Encoding

Figure 12:
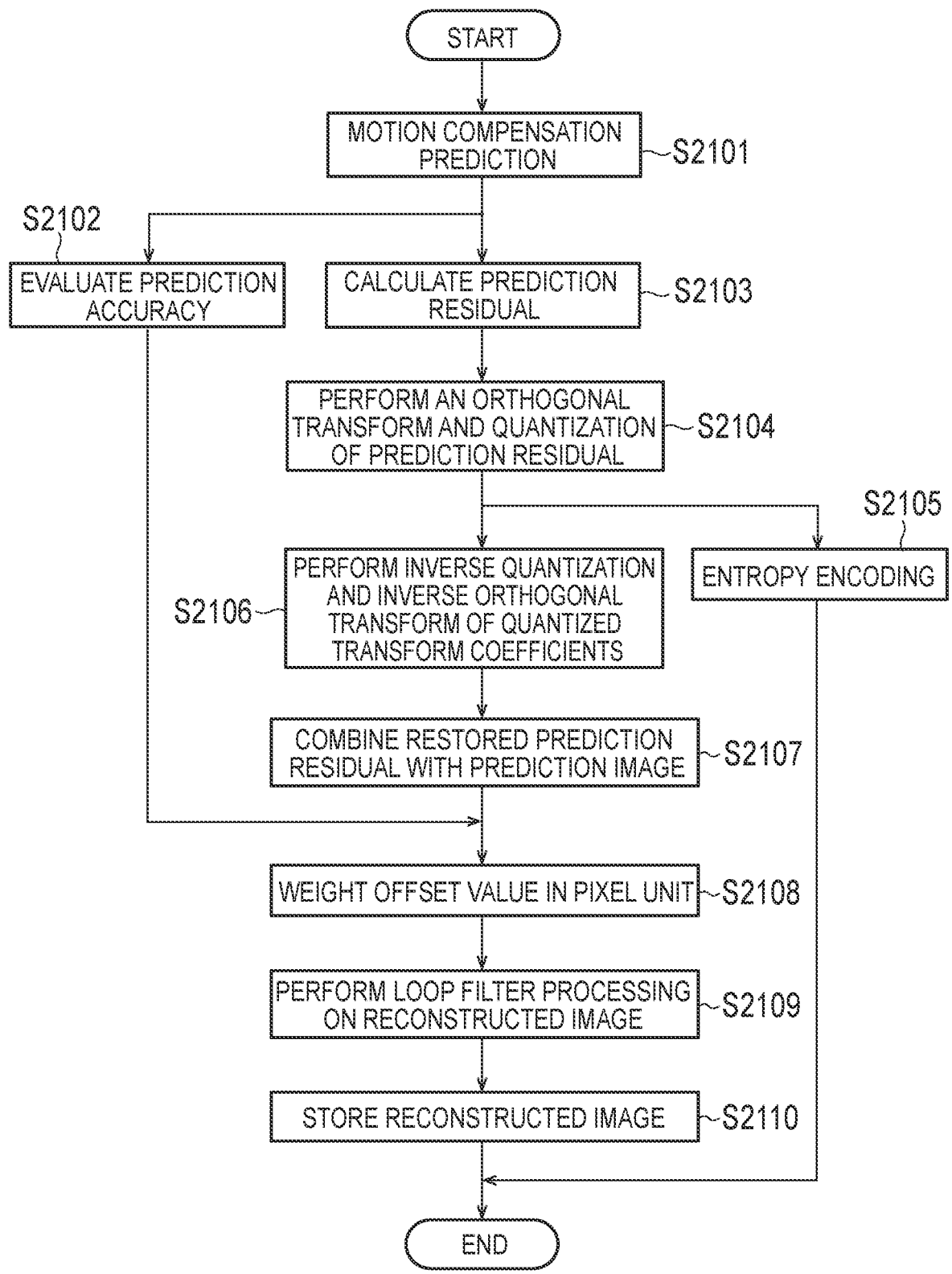
FIG. 12 illustrates processing flow at the image encoding device according to the second embodiment.

FIG. 12 illustrates processing flow at the image encoding device 1 according to the second embodiment.

As illustrated in FIG. 12, in step S2101, the motion compensation predictor 109 predicts the target image block by performing motion compensation prediction using a plurality of reference images to generate the prediction image corresponding to the target image block. The entropy encoder 103 encodes the motion compensation prediction information as part of the encoded data to generate the encoded data including the motion compensation prediction information and outputs the encoded data.

In step S2102, the evaluator 111 evaluates prediction accuracy of the prediction image in a pixel unit by calculating a degree of similarity between the plurality of reference images in a pixel unit to generate map information including weights for respective pixels within the block.

In step S2103, the subtractor 101 calculates the prediction residual indicating a difference in a pixel unit between the target image block and the prediction image.

In step S2104, the transformer/quantizer 102 generates quantized transform coefficients by performing an orthogonal transform and quantization of the prediction residual calculated by the subtractor 101.

In step S2105, the entropy encoder 103 entropy encodes the quantized transform coefficients and outputs the encoded data.

In step S2106, the inverse quantizer/inverse transformer 104 restores the prediction residual by performing inverse quantization and an inverse orthogonal transform of the quantized transform coefficients to generate the restored prediction residual.

In step S2107, the combiner 105 reconstructs the target image block by combining the restored prediction residual with the prediction image in a pixel unit to generate the reconstructed image.

In step S2108, the loop filter 107 controls filter strength in filter processing in a pixel unit based on the result (map information) of evaluation by the evaluator 111. Specifically, as described above, the loop filter 107 applies a weight to an offset value which defines the filter strength in a pixel unit. Further, the entropy encoder 103 encodes information regarding the loop filter (an offset, category information to which the offset is to be provided, and the like) as part of the encoded data and outputs the encoded data including the information regarding the loop filter.

In step S2109, the loop filter 107 performs filter processing (sample adaptive offset processing) by adding the weighted offset value to the reconstructed image in a pixel unit and outputs the reconstructed image subjected to the filter processing.

In step S2110, the frame memory 108 stores the reconstructed image subjected to the filter processing in a frame unit.

2.5. Operation of Image Decoding

Figure 13:
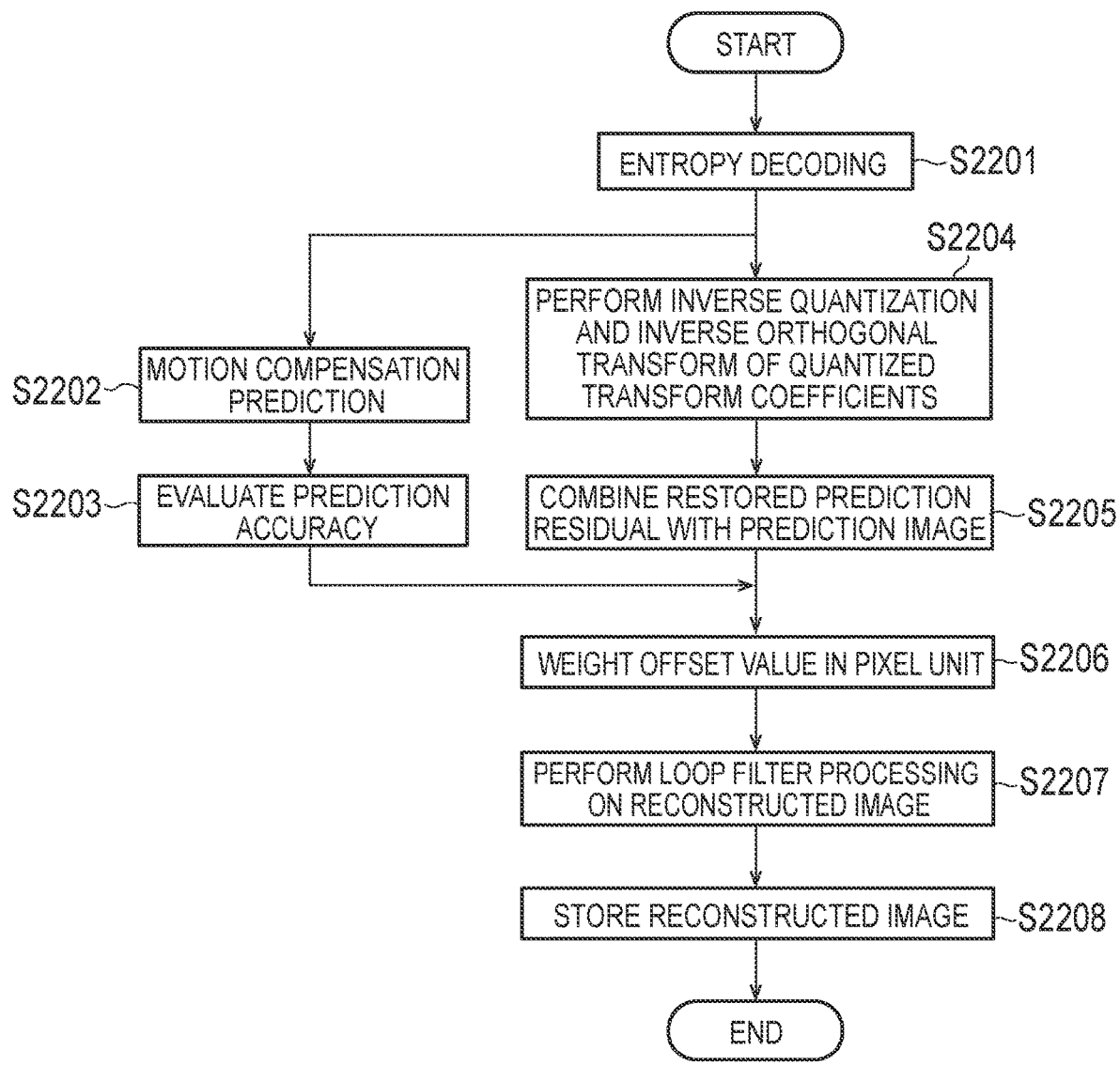
FIG. 13 illustrates processing flow at the image decoding device according to the second embodiment.

FIG. 13 illustrates processing flow at the image decoding device 2 according to the second embodiment.

As illustrated in FIG. 13, in step S2201, the entropy code decoder 200 decodes the encoded data to acquire the quantized transform coefficients, the motion vector information and the information regarding the loop filter.

In step S2202, the motion compensation predictor 206 predicts the target image block by performing motion compensation prediction using a plurality of reference images based on the motion vector information to generate the prediction image corresponding to the target image block.

In step S2203, the evaluator 208 evaluates prediction accuracy of the prediction image in a pixel unit by calculating a degree of similarity between the plurality of reference images in a pixel unit to generate map information including weights for respective pixels within the block.

In step S2204, the inverse quantizer/inverse transformer 201 restores the prediction residual by performing inverse quantization and an inverse orthogonal transform of the quantized transform coefficients to generate the restored prediction residual.

In step S2205, the combiner 202 reconstructs the target image block by combining the restored prediction residual with the prediction image in a pixel unit to generate the reconstructed image.

In step S2206, the loop filter 204 controls filter strength in filter processing in a pixel unit based on the result (map information) of evaluation by the evaluator 208. Specifically, as described above, the loop filter 204 applies a weight to an offset value which defines filter strength in a pixel unit.

In step S2207, the loop filter 204 performs filter processing (sample adaptive offset processing) by adding the weighted offset value to the reconstructed image in a pixel unit and outputs the reconstructed image subjected to the filter processing.

In step S2208, the frame memory 205 stores and outputs the reconstructed image subjected to the filter processing in a frame unit.

2.6. Conclusion of Second Embodiment

The evaluator 111 of the image encoding device 1 evaluates prediction accuracy of the prediction image in a pixel unit by calculating a degree of similarity between the plurality of reference images in a pixel unit. The loop filter 107 then controls filter strength in filter processing in a pixel unit based on the result of evaluation by the evaluator 111.

The evaluator 208 of the image decoding device 2 evaluates prediction accuracy of the prediction image in a pixel unit by calculating a degree of similarity between the plurality of reference images in a pixel unit. The loop filter 204 then controls filter strength in filter processing in a pixel unit based on the result of evaluation by the evaluator 208.

By this means, it is possible to weaken filter processing by reducing filter strength at a portion where prediction is performed with high accuracy. Further, it is possible to strengthen filter processing by increasing filter strength for a portion where prediction is not performed with high accuracy. Consequently, it is possible to improve image quality and improve encoding efficiency in a case where motion compensation prediction is performed using a plurality of reference images.

3. Modifications of First and Second Embodiments

In the above-described first and second embodiments, an example has been described where the evaluator 111 evaluates prediction accuracy of the prediction image for each one pixel by calculating a degree of similarity between the plurality of reference images to be used for prediction for each one pixel. Further, in the above-described first embodiment, an example has been described where the combiner 105 controls the restored prediction residual to be combined with the prediction image for each one pixel based on the result of evaluation by the evaluator 111. Further, in the above-described second embodiment, an example has been described where the loop filter 107 controls filter strength in filter processing for each one pixel based on the result of evaluation by the evaluator 111.

However, the processing may be performed in a unit of group (sub-block) including a plurality of pixels in place of in a pixel unit. In the present modification, the target image block is divided into N sub-blocks (N is an integer of 2 or greater. Here, each sub-block includes m×n pixels, where at least one of m and n is an integer of 2 or greater. The evaluator 111 calculates weights Wij of respective pixels (ij) using the method in the above-described embodiments and calculates an average value Wk of the weights Wij for each k-th sub-block (where 0≤k≤N).

Then, in the above-described first embodiment, the evaluator 111 outputs the weight average value Wk calculated for each sub-block to the combiner 105. The combiner 105 controls the restored prediction residual to be combined with the prediction image for each sub-block using the weight average value Wk. Specifically, the combiner 105 applies a weight to the restored prediction residual input from the inverse transformer 104b in a sub-block unit using the weight average value Wk input from the evaluator 111, and generates the reconstructed image by adding the weighted restored prediction residual to the prediction image in a pixel unit. Note that the image decoding device 2 also performs similar processing.

In the above-described second embodiment, the evaluator 111 outputs the weight average value Wk calculated for each sub-block to the loop filter 107. The loop filter 107 controls filter strength in filter processing for each sub-block using the weight average value Wk. Specifically, the loop filter 107 applies a weight to an offset value to be used for sample adaptive offset processing in a sub-block unit and performs filter processing (sample adaptive offset processing) by adding the weighted offset value to the reconstructed image in a pixel unit. Note that the image decoding device 2 also performs similar processing.

3. Third Embodiment 3.1. Configuration of Image Encoding Device

Figure 16:
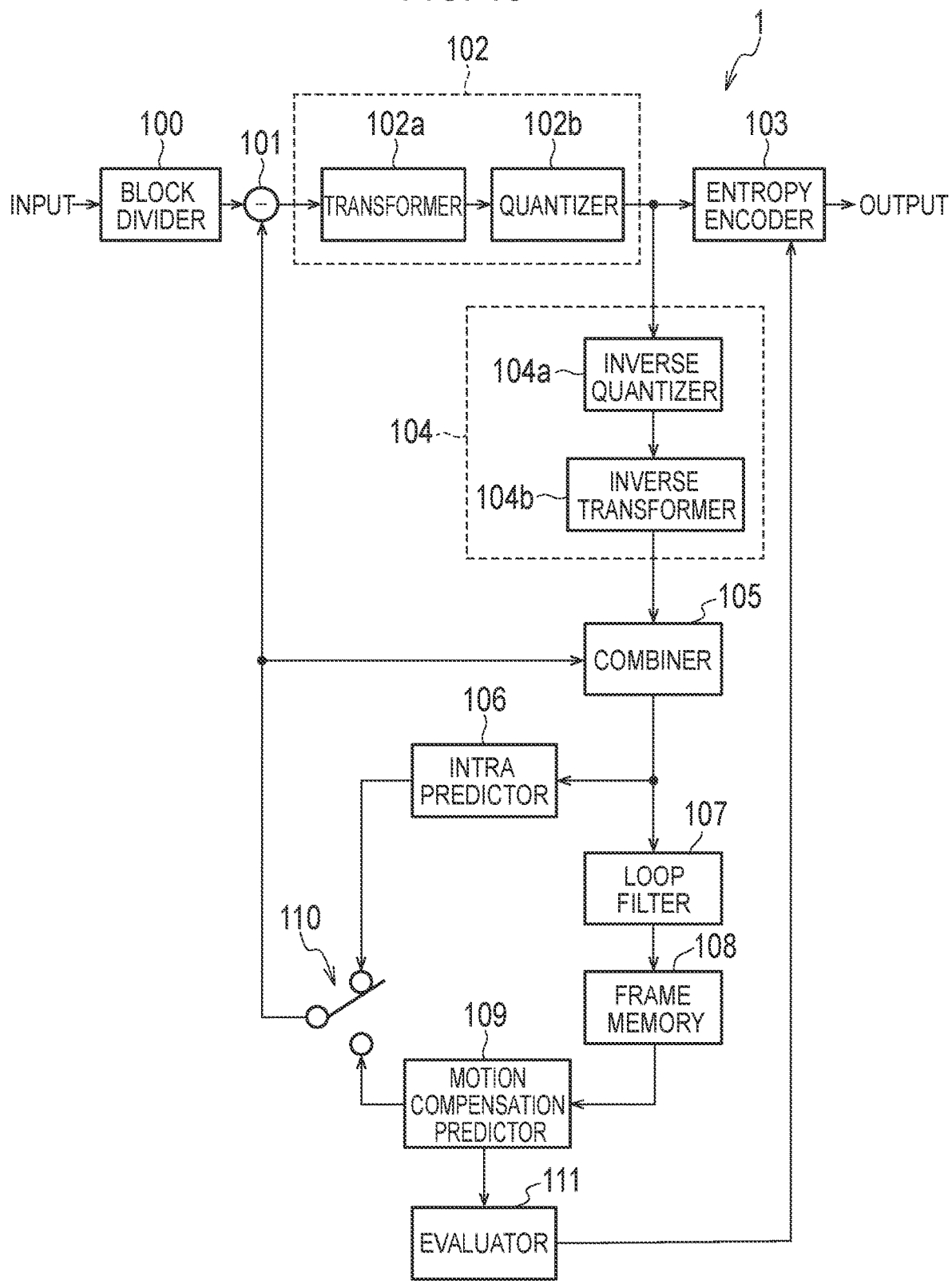
FIG. 16 illustrates a configuration of an image encoding device according to a third embodiment.

FIG. 16 illustrates a configuration of the image encoding device 1 according to the third embodiment. As illustrated in FIG. 16, the image encoding device 1 includes the block divider 100, the subtractor 101, the transformer 102a, the quantizer 102b, the entropy encoder 103, the inverse quantizer 104a, the inverse transformer 104b, the combiner 105, the intra predictor 106, the loop filter 107, the frame memory 108, the motion compensation predictor 109, the switcher 110, and the evaluator 111.

The block divider 100 divides an input image which is in a frame (or picture) unit into blocks which are small areas, and outputs image blocks to the subtractor 101 (and the motion compensation predictor 109). A size of the image block is, for example, 32×32 pixels, 16×16 pixels, 8×8 pixels, 4×4 pixels, or the like. The image block which is a unit of encoding to be performed by the image encoding device 1 and a unit of decoding to be performed by the image decoding device 2, will be referred to as a target image block.

The subtractor 101 calculates a prediction residual indicating a difference in a pixel unit between the target image block input from the block divider 100 and a prediction image (prediction image block) corresponding to the target image block. Specifically, the subtractor 101 calculates the prediction residual by subtracting each pixel value of the prediction image from each pixel value of the encoding target block, and outputs the calculated prediction residual to the transformer 102a. Note that the prediction image is input to the subtractor 101 from the intra predictor 106 or the motion compensation predictor 109 which will be described later via the switcher 110.

The transformer 102a and the quantizer 102b configure a transformer/quantizer 102 which performs orthogonal transform processing and quantization processing in a block unit.

The transformer 102a calculates transform coefficients for each frequency component by performing an orthogonal transform of the prediction residual input from the subtractor 101 and outputs the calculated transform coefficients to the quantizer 102b. The orthogonal transform includes, for example, discrete cosine transform (DCT), discrete sine transform (DST), Karhunen-Loeve Transform (KLT), and the like. The orthogonal transform is processing of transforming a residual signal in a pixel area into a signal in a frequency domain.

The quantizer 102b quantizes the transform coefficients input from the transformer 102a using the quantization parameter (Qp) and the quantization matrix to generate the quantized transform coefficients. The quantization parameter (Qp) is a parameter to be applied in common to respective transform coefficients within a block and is a parameter which defines roughness of quantization. The quantization matrix is a matrix having a quantization value upon quantization of the respective transform coefficients as an element. The quantizer 102b outputs quantization control information, the generated quantizer transform coefficient information, and the like, to the entropy encoder 103 and the inverse quantizer 104a.

The entropy encoder 103 entropy encodes the quantized transform coefficients input from the quantizer 102b, generates encoded data (bit stream) by compressing data, and outputs the encoded data to outside of the image encoding device 1. Huffman codes, context-based adaptive binary arithmetic coding (CABAC), or the like, can be used in entropy encoding. The entropy encoding includes processing called serialization of reading out transform coefficients arranged in two dimensions in predetermined scanning order and transforming the transform coefficients into a transform coefficient sequence in one dimension. Here, the transform coefficients are efficiently encoded up to a significant coefficient (non-zero coefficient) which is the last coefficient in the predetermined scanning order, and which is set as an end position.

Note that the entropy encoder 103 receives input of information regarding prediction from the intra predictor 106 and the motion compensation predictor 109 and receives input of information regarding filter processing from the loop filter 107. The entropy encoder 103 also entropy encodes these kinds of information.

The inverse quantizer 104a and the inverse transformer 104b configure an inverse quantizer/inverse transformer 104 which performs inverse quantization processing and inverse orthogonal transform processing in a block unit.

The inverse quantizer 104a performs inverse quantization processing corresponding to the quantization processing performed by the quantizer 102b. Specifically, the inverse quantizer 104a restores the transform coefficients by performing inverse quantization of the quantized transform coefficients input from the quantizer 102b using the quantization parameter (Qp) and the quantization matrix, and outputs the restored transform coefficients to the inverse transformer 104b.

The inverse transformer 104b performs inverse orthogonal transform processing corresponding to the orthogonal transform processing performed by the transformer 102a. For example, in a case where the transformer 102a performs discrete cosine transform, the inverse transformer 104b performs inverse discrete cosine transform. The inverse transformer 104b restores the prediction residual by performing an inverse orthogonal transform of the transform coefficients input from the inverse quantizer 104a and outputs the restored prediction residual to the combiner 105.

The combiner 105 combines the restored prediction residual input from the inverse transformer 104b with the prediction image input from the switcher 110 in a pixel unit. The combiner 105 reconstructs the target image block by adding respective pixel values of the restored prediction residual and respective pixel values of the prediction image and outputs the reconstructed image which is the reconstructed target image block to the intra predictor 106 and the loop filter 107.

The intra predictor 106 generates an intra-predicted image by performing intra prediction using the reconstructed image input from the combiner 105 and outputs the intra-predicted image to the switcher 110. Further, the intra predictor 106 outputs information of the selected intra prediction mode, and the like, to the entropy encoder 103.

The loop filter 107 performs filter processing as post processing on the reconstructed image input from the combiner 105, and outputs the reconstructed image subjected to the filter processing to the frame memory 108. Further, the loop filter 107 outputs information regarding the filter processing to the entropy encoder 103. The filter processing includes deblocking filter processing and sample adaptive offset processing in the HEVC standards.

The frame memory 108 stores the reconstructed image input from the loop filter 107 in a frame unit.

The motion compensation predictor 109 performs inter prediction using one or more reconstructed images stored in the frame memory 108 as reference images. Specifically, the motion compensation predictor 109 calculates a motion vector using am approach such as block matching, generates a motion compensation prediction image based on the motion vector, and outputs the motion compensation prediction image to the switcher 110. Further, the motion compensation predictor 109 outputs information regarding the motion vector to the entropy encoder 103.

The switcher 110 switches between the intra-predicted image input from the intra predictor 106 and the motion compensation prediction image input from the motion compensation predictor 109 and outputs the prediction image (the intra-predicted image or the motion compensation prediction image) to the subtractor 101 and the combiner 105.

The evaluator 111 evaluates a degree of similarity between the plurality of reference images for each frequency component in a case where the motion compensation predictor 109 performs motion compensation prediction using the plurality of reference images, and outputs information of the evaluation result to the entropy encoder 103. While not illustrated in the present embodiment, in a case of intra prediction (for example, an intra block copy mode) using a plurality of reference images, in a case where the intra predictor 106 performs prediction using a plurality of reference images, the evaluator 111 evaluates a degree of similarity between the plurality of reference images for each frequency component and outputs this evaluation result to the entropy encoder 103. The entropy encoder 103 rearranges the transform coefficients input from the quantizer 102b based on the result of evaluation by the evaluator 111 and encodes the rearranged transform coefficients. The evaluator 111 and the entropy encoder 103 will be described in detail later.

3.2. Configuration of Image Decoding Device

Figure 17:
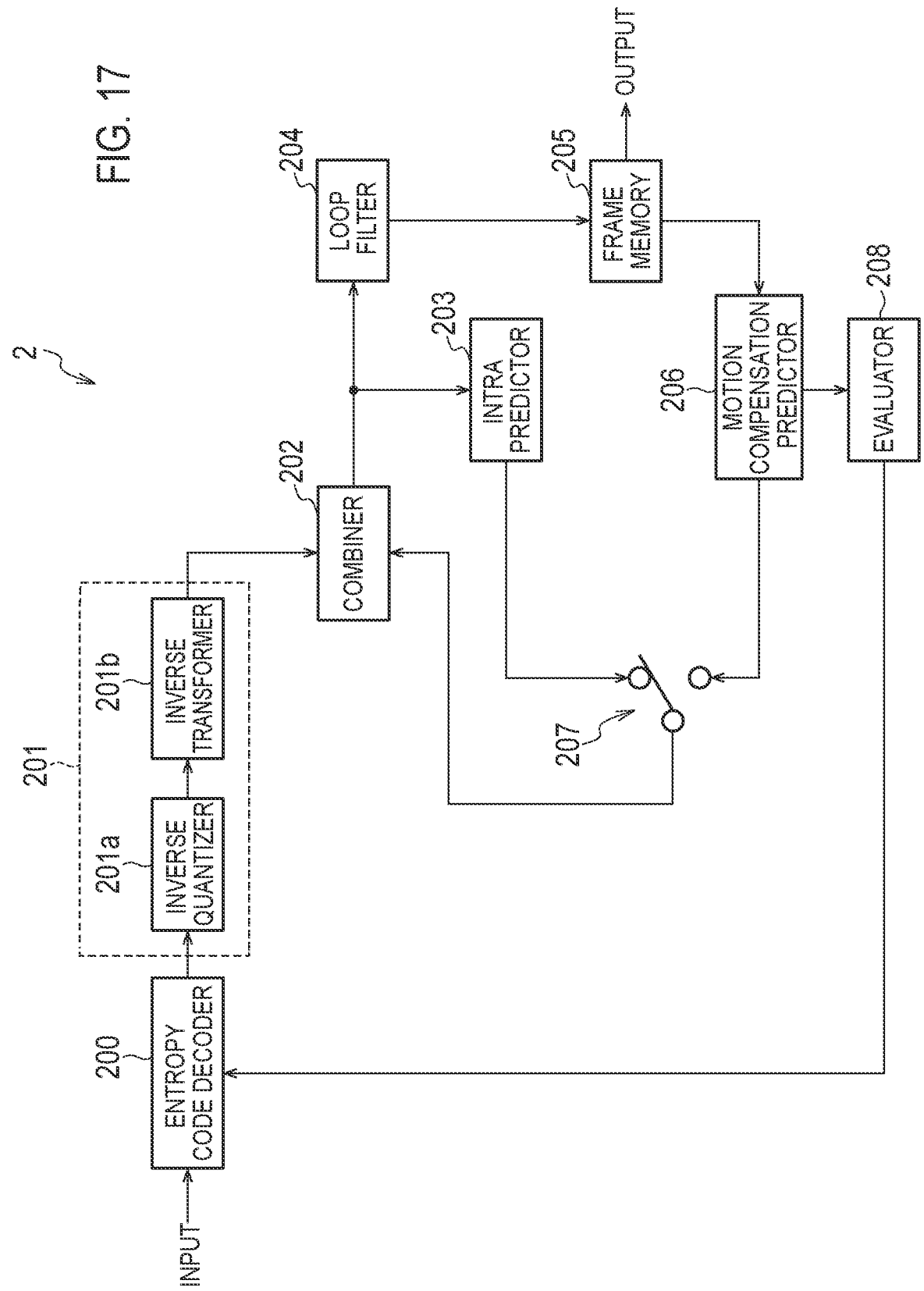
FIG. 17 illustrates a configuration of an image decoding device according to the third embodiment.

FIG. 17 illustrates a configuration of the image decoding device 2 according to the third embodiment. As illustrated in FIG. 17, the image decoding device 2 includes the entropy code decoder 200, the inverse quantizer 201a, the inverse transformer 201b, the combiner 202, the intra predictor 203, the loop filter 204, the frame memory 205, the motion compensation predictor 206, the switcher 207, and the evaluator 208.

The entropy code decoder 200 decodes the encoded data generated by the encoding device 1 and outputs the quantized transform coefficients to the inverse quantizer 201a. Further, the entropy code decoder 200 decodes the encoded data to acquire the information regarding the prediction (intra prediction and motion compensation prediction) and the information regarding the filter processing, outputs the information regarding the prediction to the intra predictor 203 and the motion compensation predictor 206, and outputs the information regarding the filter processing to the loop filter 204.

The inverse quantizer 201a and the inverse transformer 201b configure an inverse quantizer/inverse transformer 201 which performs inverse quantization processing and inverse orthogonal transform processing in a block unit.

The inverse quantizer 201a performs inverse quantization processing corresponding to the quantization processing performed by the quantizer 102b of the image encoding device 1. The inverse quantizer 201a restores the transform coefficients by performing inverse quantization of the quantized transform coefficients input from the entropy code decoder 200 using the quantization parameter (Qp) and the quantization matrix, and outputs the restored transform coefficients to the inverse transformer 201b.

The inverse transformer 201b performs inverse orthogonal transform processing corresponding to the orthogonal transform processing performed by the transformer 102a of the image encoding device 1. The inverse transformer 201b restores the prediction residual by performing an inverse orthogonal transform of the transform coefficients input from the inverse quantizer 201a, and outputs the restored prediction residual to the combiner 202.

The combiner 202 reconstructs the original target image block by combining the prediction residual input from the inverse transformer 201b with the prediction image input from the switcher 207 in a pixel unit, and outputs the reconstructed image to the intra predictor 203 and the loop filter 204.

The intra predictor 203 generates an intra-predicted image by performing intra prediction in accordance with the intra prediction information input from the entropy code decoder 200 with reference to the reconstructed block image input from the combiner 202, and outputs the intra-predicted image to the switcher 207.

The loop filter 204 performs filter processing which is similar to the filter processing performed by the loop filter 107 of the image encoding device 1, on the reconstructed image input from the combiner 202 based on the filter processing information input from the entropy code decoder 200, and outputs the reconstructed image subjected to the filter processing to the frame memory 205.

The frame memory 205 stores the reconstructed image input from the loop filter 204 in a frame unit. The frame memory 205 outputs the stored reconstructed images to outside of the image decoding device 2 in display order in a similar manner to the processing of the entropy encoder 103.

The motion compensation predictor 206 generates a motion compensation prediction image by performing motion compensation prediction (inter prediction) in accordance with the motion vector information input from the entropy code decoder 200 using one or more reconstructed images stored in the frame memory 205 as reference images, and outputs the motion compensation prediction image to the switcher 207.

The switcher 207 switches between the intra-predicted image input from the intra predictor 203 and the motion compensation prediction image input from the motion compensation predictor 206 and outputs the prediction image (the intra-predicted image or the motion compensation prediction image) to the combiner 202.

The evaluator 208 performs operation similar to that performed by the evaluator 111 of the image encoding device 1. Specifically, in a case where the motion compensation predictor 206 performs motion compensation prediction using a plurality of reference images, the evaluator 208 evaluates a degree of similarity between the plurality of reference images for each frequency component and outputs information of the evaluation result to the entropy code decoder 200. The entropy code decoder 200 decodes the encoded data to acquire the transform coefficients for each frequency component, rearranges the transform coefficients based on the result of evaluation by the evaluator 208 and outputs the rearranged transform coefficients. The evaluator 208 and the entropy code decoder 200 will be described in detail later.

3.3. Motion Compensation Prediction

FIG. 3 illustrates an example of motion compensation prediction. FIG. 4 illustrates an example of the prediction image generated through motion compensation prediction. A case will be described as a simple example of the motion compensation prediction where bi-prediction used in HEVC, particularly, forward direction and backward prediction (bi-directional prediction) are used.

As illustrated in FIG. 3, the motion compensation prediction is performed with reference to temporally preceding and subsequent frames with respect to a target frame (current frame). In the example in FIG. 3, motion compensation prediction of a block in an image of a t-th frame is performed with reference to a t−1-th frame and a t+1-th frame. In the motion compensation, portions (blocks) within the t−1-th reference frame and the t+1-th reference frame, which are similar to the target image block are detected from a search range set at a system.

The detected portions are reference images. Information indicating relative positions of the reference images with respect to the target image block indicated with an arrow in the drawing, will be referred to as a motion vector. Information of the motion vector is entropy encoded along with the frame information of the reference images at the image encoding device 1. Meanwhile, the image decoding device 2 detects the reference images based on the information of the motion vector generated by the image encoding device 1.

As illustrated in FIG. 3 and FIG. 4, reference images 1 and 2 detected through motion compensation are similar partial images aligned with the target image block, within the frames to be referred to, and are thus regarded as images similar to the target image block (encoding target image). In the example in FIG. 4, the target image block includes a design of a star and a design of a partial circle. The reference image 1 includes a design of a star and a design of the entire circle. The reference image 2 includes a design of a star, but does not include a design of a circle.

The prediction image is generated from such reference images 1 and 2. Note that, typically, the prediction processing enables generation of the image having features of the respective reference images with higher prediction accuracy by averaging the reference images 1 and 2 which have different features but are partially similar to each other. However, the prediction image may be generated also using more advanced processing, for example, signal enhancement processing using a low-pass filter, a high-pass filter, or the like. Here, if the prediction image is generated by averaging the reference image 1 which includes a design of a circle and the reference image 2 which does not include a design of a circle illustrated in the drawings, the design of the circle which cannot be predicted from the reference image 2 can be reflected in prediction. However, signals of the design of the circle in the prediction image decreases by half compared to those of the reference image 1.

A difference between the prediction image obtained from the reference images 1 and 2 and the target image block (encoding target image) is the prediction residual. The prediction residual indicated in FIG. 4 indicates that a large difference exists only at a portion where edges of the stars in the designs are misaligned and at a portion where the circles in the designs are misaligned (shaded portions), and prediction is performed with high accuracy and has less differences at other portions (a difference does not exist in the example in FIG. 4).

The portions where a difference does not exist (a portion which does not correspond to edges of the stars in the designs and a background portion) are portions where a degree of similarity between the reference image 1 and the reference image 2 is high, and where prediction is performed with high accuracy. Meanwhile, portions where a large difference exists are portions unique to the respective reference images, that is, portions where the degree of similarity between the reference image 1 and the reference image 2 is significantly low. Thus, it can be known that reliability of prediction is low and a large difference (residual) is likely to occur at portions where the degree of similarity between the reference image 1 and the reference image 2 is significantly low.

If the prediction residual including a portion with a large difference and a portion with no difference is orthogonally transformed, signal degradation due to quantization of the transform coefficients is uniformly multiplexed regardless of the prediction accuracy, which results in degradation of encoding quality.

The evaluator 111 in the third embodiment evaluates the degree of similarity between the plurality of reference images for each frequency component and outputs information of the evaluation result to the entropy encoder 103. The entropy encoder 103 rearranges the transform coefficients input from the quantizer 102b based on the result of evaluation by the evaluator 111 and encodes the rearranged transform coefficients.

Here, a frequency component in which the degree of similarity between the plurality of reference images is low can be regarded as a frequency component having large energy. Meanwhile, a frequency component in which the degree of similarity between the plurality of reference images is high can be regarded as a frequency component having energy which is close to zero. Therefore, according to the rearranging order of the transform coefficients determined by the evaluator 111, it is possible to efficiently encode the transform coefficients by the entropy encoder 103 rearranging the transform coefficients so that transform coefficients in a frequency component for which the degree of similarity is low are converged (put together).

Therefore, even in a case where degree of energy compaction of the transform coefficients is lowered due to energy being not compacted on low frequency components in the residual image after orthogonal transform, it is possible to perform efficient entropy encoding, so that it is possible to improve encoding efficiency.

3.4. Evaluator

Figure 18:
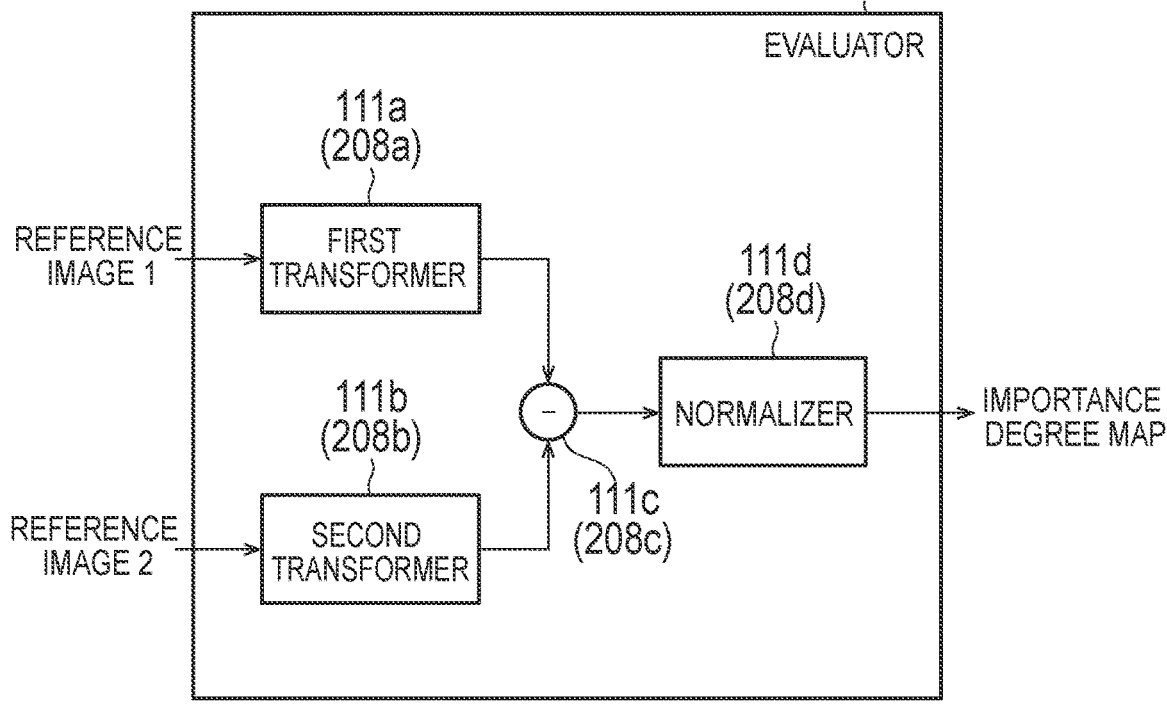
FIG. 18 illustrates an example of a configuration of an evaluator according to the third embodiment.

FIG. 18 illustrates an example of a configuration of the evaluator 111 at the image encoding device 1. As illustrated in FIG. 18, the evaluator 111 includes a first transformer 111a, a second transformer 111b, a similarity degree calculator 111c, and a normalizer 111d. Note that, while an example where the evaluator 111 includes the normalizer 111d will be described, the evaluator 111 does not necessarily have to include the normalizer 111d because the present invention is directed to determining encoding order of coefficients based on the degree of similarity.

The first transformer 111a calculates first transform coefficients for each frequency component by performing an orthogonal transform of a reference image 1 (first reference image) input from the motion compensation predictor 109, and outputs the calculated first transform coefficients to the similarity degree calculator 111c.

The second transformer 111b calculates second transform coefficients for each frequency component by performing an orthogonal transform of a reference image 2 (second reference image) input from the motion compensation predictor 109, and outputs the calculated second transform coefficients to the similarity degree calculator 111c.

The similarity degree calculator 111c calculates a degree of similarity between the first transform coefficients input from the first transformer 111a and the second transform coefficients input from the second transformer 111b for each frequency component and outputs the calculated degree of similarity to the normalizer 111d. The degree of similarity includes, for example, an absolute value of a difference value. A smaller absolute value of the difference value indicates a higher degree of similarity, and a greater absolute value of the difference value indicates a lower degree of similarity. The similarity degree calculator 111c may calculate the difference value after performing filter processing on the respective reference images. The similarity degree calculator 111c may calculate statistics such as a square error and may use the statistics as the degree of similarity. An example where the absolute value of the difference value is used as the degree of similarity will be described below.

The normalizer 111d normalizes the absolute value of the difference value between the transform coefficients input from the similarity degree calculator 111c with a value in a frequency component in which the absolute value of the difference value becomes a maximum within the block (that is, a maximum value of the absolute value of the difference value within the block) and outputs the normalized absolute value of the difference value. The normalized difference value is used as a degree of importance for determining encoding order of the transform coefficients at the entropy encoder 103. A degree of importance in encoding of the transform coefficients of the prediction error signal becomes lower for transform coefficients between which the absolute value is smaller because a smaller absolute value between the transform coefficients indicates a higher degree of similarity and higher prediction accuracy. Meanwhile, transform coefficients between which the absolute value is greater can be regarded as coefficients for which a degree of importance in encoding of the transform coefficients of the prediction error signal is higher because a greater absolute value for the coefficients indicates a lower degree of similarity and lower prediction accuracy. The entropy encoder 103 therefore preferentially encodes the transform coefficients in a frequency component with a high degree of importance.

The normalizer 111d may adjust a normalization difference value (degree of importance) input from the normalizer 111d based on at least one of the quantization parameter (Qp) which defines roughness of quantization and the quantization matrix to which different quantization values are applied for each transform coefficient, and may output the adjusted degree of importance. If a roughness degree of quantization is higher, a degradation degree of the restored prediction residual is higher. It is therefore possible to set the degree of importance in view of the degradation degree by adjusting the normalization difference value based on the quantization parameter (Qp) and the quantization value of the quantization matrix.

A degree of importance $R_{ij}$ of each frequency component (ij) output from the evaluator 111 can be expressed with, for example, the following expression (4).

$$Rij = (\text{abs}(Xij - Yij)/\text{maxD} \times \text{Scale}(Qp)) \quad (4)$$

In expression (4), $X_{ij}$ is a transform coefficient of the frequency component ij of the reference image 1, $Y_{ij}$ is a transform coefficient of the frequency component ij of the reference image 2, and abs is a function for obtaining an absolute value. The similarity degree calculator 111c outputs $\text{abs}(Xij - Yij)$.

Further, in expression (4), maxD is a maximum value of a difference value $\text{abs}(Xij - Yij)$ within the block. While it is necessary to obtain a difference value between the transform coefficients for all frequency components within the block to obtain maxD, it is also possible to use a maximum value, or the like, of an adjacent block which has already been subjected to encoding processing as a substitute for the difference values for all frequency components within the block to skip this processing, and, for example, in a case where there is a value equal to or greater than the maximum value, it is also possible to normalize maxD by performing clipping with the maximum value which has been used. Alternatively, it is also possible to obtain maxD from the quantization parameter (Qp) and the quantization value of the quantization matrix using a table which defines correspondence relationship between the quantization parameter (Qp) and the quantization value of the quantization matrix, and maxD. Alternatively, it is also possible to use a fixed value defined in specifications in advance as maxD. The normalizer 111d outputs abs(Xij−Yij)/maxD.

Further, in expression (4), Scale(Qp) is a coefficient to be multiplied in accordance with the quantization parameter (Qp) and the quantization value of the quantization matrix. Scale(Qp) is designed so as to approach 1.0 in a case where Qp or the quantization value of the quantization matrix is greater and approach 0 in a case where Qp or the quantization value of the quantization matrix is smaller, and a degree of approach is adjusted by a system. Alternatively, it is also possible to use a fixed value defined in specifications in advance as Scale(Qp). Further, to simplify the processing, it is also possible to set a fixed value such as 1.0 designed in accordance with the system as Scale(Qp).

The normalizer 111d outputs abs(Xij−Yij)/maxD×Scale (Qp) as the degree of importance Rij. Alternatively, the normalizer 111d may output a weight adjusted with a sensitivity function designed in accordance with the system as this Rij. For example, sensitivity may be adjusted not only with Rij=Clip(rij, 1.0, 0.0) in abs(Xij−Yij)/maxD×Scale(Qp) =rij, but also with Rij=Clip(rij+offset, 1.0, 0.0) by adding an offset. Note that Clip(x, max, min) indicates processing of performing clipping with max in a case where x exceeds max, and performing clipping with min in a case where x falls below min.

The degree of importance Rij calculated in this manner becomes a value within a range from 0 to 1.0. Basically, the degree of importance Rij approaches 1.0 in a case where the difference value between transform coefficients of the frequency components ij is greater (that is, prediction accuracy is lower), and approaches 0 in a case where the difference value is smaller (that is, prediction accuracy is higher). The evaluator 111 outputs map information (hereinafter, referred to as a "importance degree map") including the degrees of importance Rij of the respective frequency components ij within the block to the entropy encoder 103.

Note that the evaluator 111 performs evaluation (calculates the degree of importance Rij) only in a case where motion compensation prediction using a plurality of reference images is applied, and does not perform evaluation (does not calculate the degree of importance Rij) or uniformly sets 1.0 as the degree of importance Rij in other modes, for example, in unidirectional prediction or in intra prediction processing in which a plurality of reference images are not used.

Further, the evaluator 208 in the image decoding device 2 is configured in a similar manner to the evaluator 111 in the image encoding device 1. Specifically, the evaluator 208 in the image decoding device 2 includes a first transformer 208a, a second transformer 208b, a similarity degree calculator 208c, and a normalizer 208d. The evaluator 208 in the image decoding device 2 outputs the importance degree map including the degrees of importance Rij of the respective frequency components ij within the block to the entropy code decoder 200.

3.5. Entropy Encoder

Figure 19:
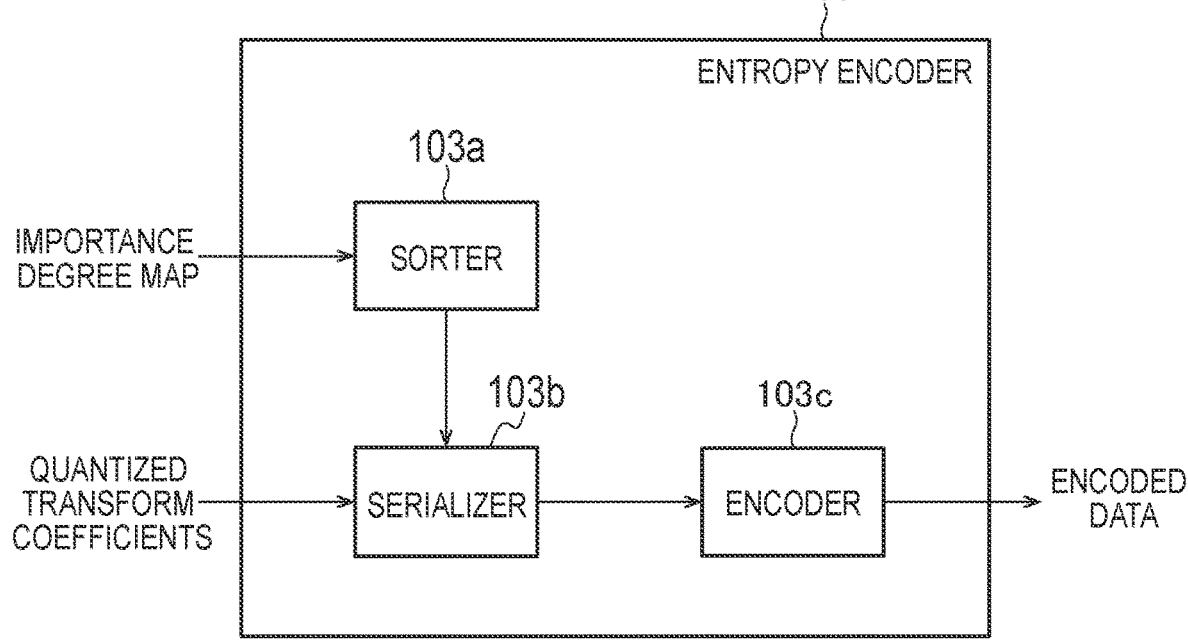
FIG. 19 illustrates an example of a configuration of an entropy encoder according to the third embodiment.

FIG. 19 illustrates an example of a configuration of the entropy encoder 103. As illustrated in FIG. 19, the entropy encoder 103 includes a sorter 103a, a serializer 103b, and an encoder 103c. The sorter 103a and the serializer 103b configure a rearranger.

The sorter 103a rearranges the degrees of importance Rij in the importance degree map input from the evaluator 111 in descending order. The sorter 103a serializes the degrees of importance Rij arranged in two dimensions in the importance degree map, for example, in scanning order defined in advance to make an importance degree sequence R[i] and stores index labels i. The sorter 103a then rearranges the index labels i in descending order of the degree of importance Rij in the importance degree sequence R[i] and outputs the index labels i rearranged in descending order of the degree of importance to the serializer 103b.

The serializer 103b performs serialization processing of reading out the transform coefficients input from the quantizer 102b in predetermined scanning order and outputting the transform coefficient sequence to the encoder 103c. The serializer 103b, for example, serializes the transform coefficients input from the quantizer 102b and arranged in two dimensions, in predetermined scanning order to make a transform coefficient sequence C[i]. Here, the serializer 103b and the sorter 103a use the same scanning order. Further, the serializer 103b rearranges the transform coefficients in the transform coefficient sequence C[i] in descending order of the degree of importance based on the index labels i input from the sorter 103a and outputs the rearranged transform coefficient sequence. In other words, the serializer 103b performs serialization processing so that the transform coefficient sequence includes transform coefficients in frequency components in ascending order of the degree of similarity between the transform coefficients based on the result of evaluation by the evaluator 111. By this means, it is possible to put significant coefficients (non-zero coefficients) together.

Alternatively, the serializer 103b may determine the scanning order so that the transform coefficients are scanned in descending order of the degree of importance, and may output the transform coefficient sequence in which the transform coefficients are arranged in descending order of the degree of importance by performing scanning in the determined scanning order.

The encoder 103c encodes the transform coefficients in the transform coefficient sequence input from the serializer 103b and outputs the encoded data. The encoder 103c encodes the transform coefficients up to the last significant coefficient set as an end position, in the transform coefficient sequence input from the serializer 103b. By putting the significant coefficients together as described above, it is possible to reduce the number of transform coefficients up to the end position, so that it is possible to shorten a length of the transform coefficient sequence to be encoded.

Note that the entropy encoder 103 may perform rearranging processing in accordance with the degree of importance only in a case where motion compensation prediction using a plurality of reference images is applied, and does not have to perform rearranging processing in accordance with the degree of importance in other modes, for example, in unidirectional prediction and intra prediction processing.

3.6. Entropy Code Decoder

Figure 20:
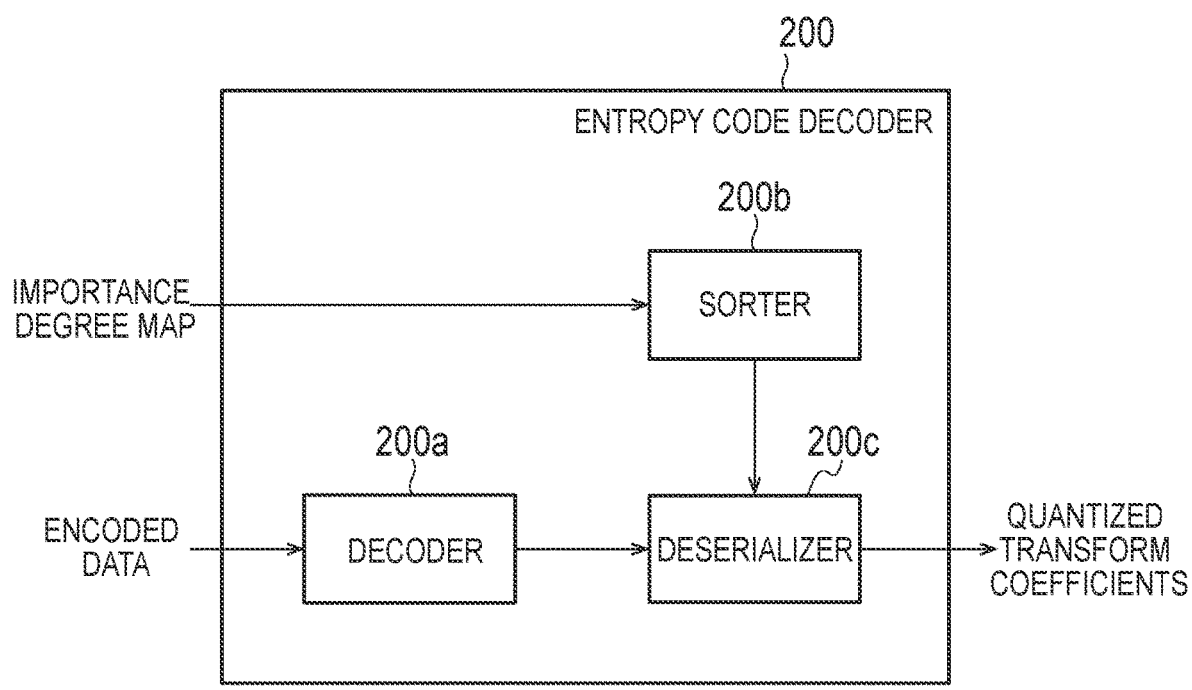
FIG. 20 illustrates an example of a configuration of an entropy code decoder according to the third embodiment.

FIG. 20 illustrates an example of a configuration of the entropy code decoder 200. As illustrated in FIG. 20, the entropy code decoder 200 includes a decoder 200a, a sorter 200b, and a deserializer 200c. The sorter 200b and the deserializer 200c configure a rearranger.

The decoder 200a decodes the encoded data generated by the image encoding device 1 to acquire the transform coefficient sequence (quantized transform coefficients) and information regarding prediction (intra prediction and motion compensation prediction), outputs the transform coefficient sequence to the deserializer 200c and outputs the information regarding prediction to the intra predictor 203 and the motion compensation predictor 206.

The sorter 200b rearranges the degrees of importance Rij in the importance degree map input from the evaluator 208 in descending order. The sorter 200b, for example, serializes the degrees of importance Rij arranged in two dimensions in the importance degree map in scanning order defined in advance to make an importance degree sequence R[i], and stores index labels i. The sorter 200b then rearranges the index labels i in descending order of the degree of importance Rij in the importance degree sequence R[i] and outputs the index labels i rearranged in descending order of the degree of importance and coordinate values (frequency components ij) corresponding to the index labels i to the deserializer 200c.

The deserializer 200c deserializes the transform coefficient sequence input from the decoder 200a based on the index labels i and the coordinate values (frequency components ij) input from the sorter 200b and outputs the transform coefficients arranged in two dimensions to the inverse quantizer 201a.

Note that the entropy code decoder 200 may perform rearranging processing in accordance with the degree of importance only in a case where motion compensation prediction using a plurality of reference images is applied and does not have to perform rearranging processing in accordance with the degree of importance in other modes, for example, in unidirectional prediction and in intra prediction processing.

3.7. Image Encoding Flow

Figure 21:
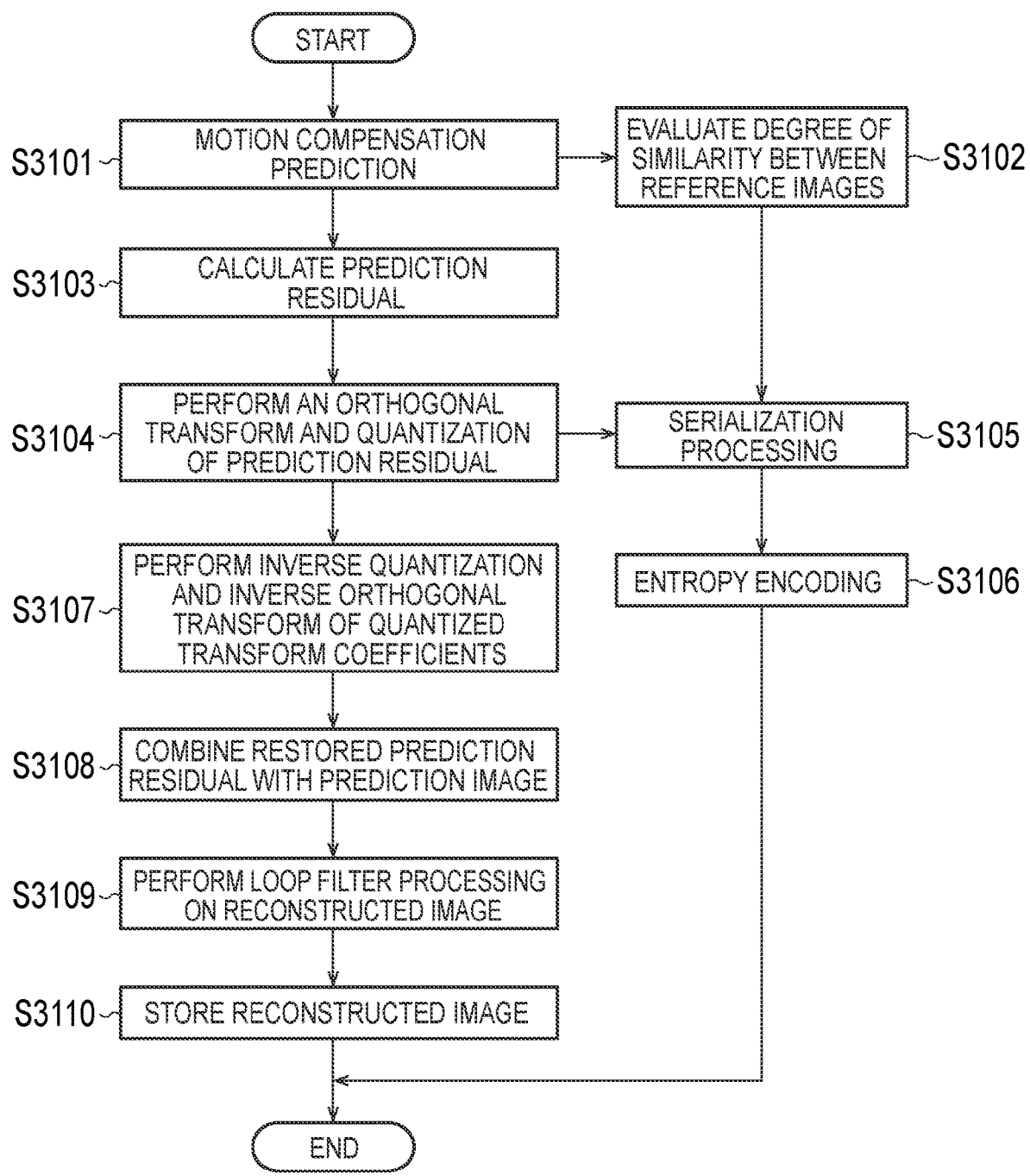
FIG. 21 illustrates processing flow at the image encoding device according to the third embodiment.

FIG. 21 illustrates processing flow at the image encoding device 1 according to the third embodiment. Here, operation relating to the present invention will be mainly described, and description regarding operation which is less relevant to the present invention will be omitted.

As illustrated in FIG. 21, in step S3101, the motion compensation predictor 109 predicts the target image block by performing motion compensation prediction using a plurality of reference images to generate the prediction image corresponding to the target image block.

In step S3102, the evaluator 111 evaluates the degree of similarity between the plurality of reference images for each frequency component to generate an importance degree map indicating degrees of importance of respective frequency components within the block.

In step S3103, the subtractor 101 calculates a prediction residual indicating a difference in a pixel unit between the target image block and the prediction image.

In step S3104, the transformer/quantizer 102 generates quantized transform coefficients by performing an orthogonal transform and quantization of the prediction residual calculated by the subtractor 101.

In step S3105, the entropy encoder 103 rearranges the transform coefficients input from the transformer/quantizer 102 (quantizer 102b) in descending order of the degree of importance (that is, in ascending order of the degree of similarity between the transform coefficients) based on the result (importance degree map) of evaluation by the evaluator 111 and outputs the rearranged transform coefficients.

In step S3106, the entropy encoder 103 entropy encodes the transform coefficients rearranged in descending order of the degree of importance and outputs the encoded data.

In step S3107, the inverse quantizer/inverse transformer 104 restores the prediction residual by performing inverse quantization and an inverse orthogonal transform of the transform coefficients input from the transformer/quantizer 102 (quantizer 102b) to generate the restored prediction residual.

In step S3108, the combiner 105 reconstructs the target image block by combining the restored prediction residual with the prediction image in a pixel unit to generate the reconstructed image.

In step S3109, the loop filter 107 performs filter processing on the reconstructed image.

In step S3110, the frame memory 108 stores the reconstructed image subjected to the filter processing in a frame unit.

3.8. Image Decoding Flow

Figure 22:
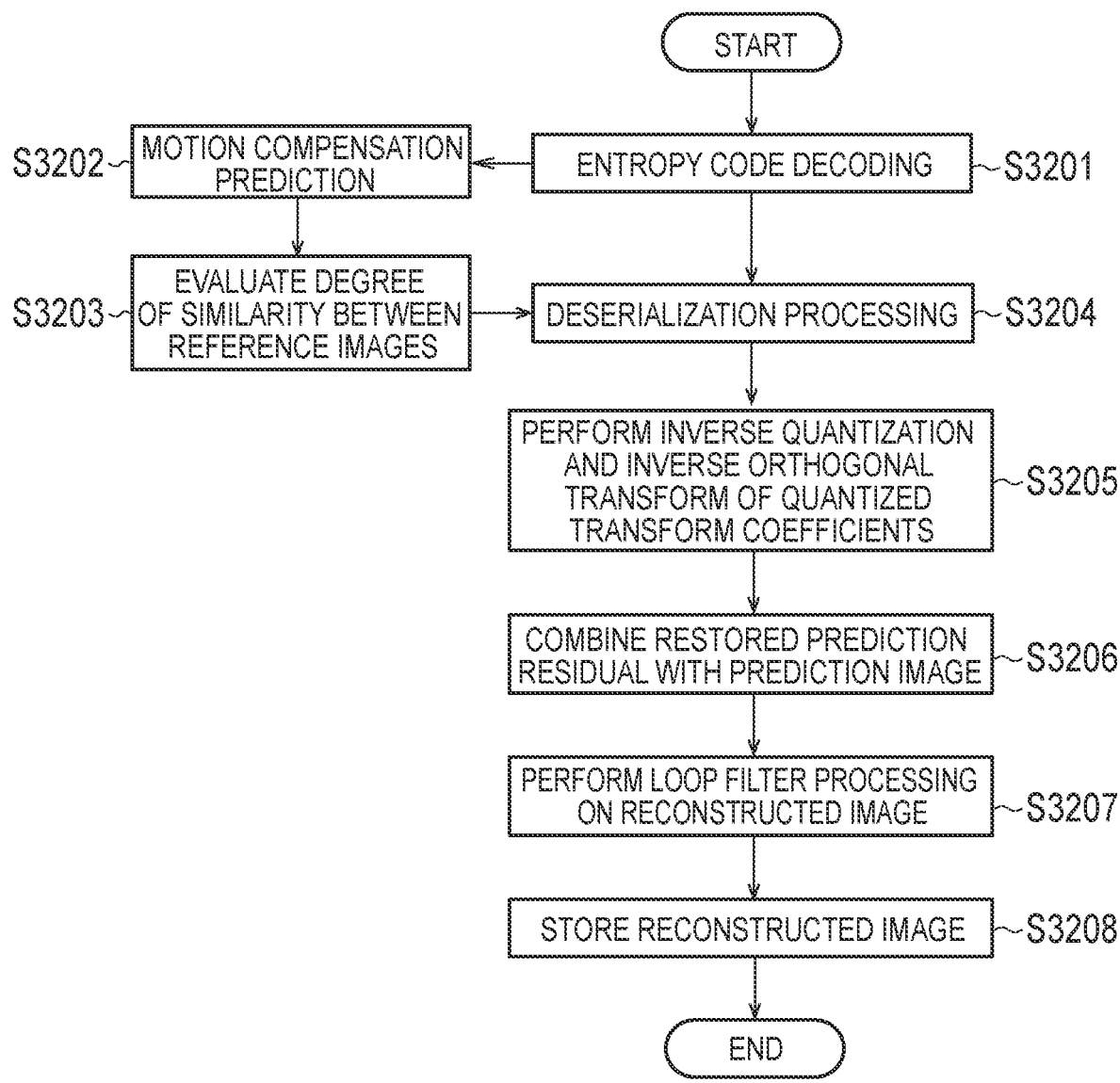
FIG. 22 illustrates processing flow at the image decoding device according to the third embodiment.

FIG. 22 illustrates processing flow at the image decoding device 2 according to the third embodiment. Here, operation relating to the present invention will be mainly described, and description of operation which is less relevant to the present invention will be omitted.

As illustrated in FIG. 22, in step S3201, the entropy code decoder 200 decodes the encoded data to acquire the motion vector information and outputs the acquired motion vector information to the motion compensation predictor 206.

In step S3202, the motion compensation predictor 206 predicts the target image block by performing motion compensation prediction using the plurality of reference images based on the motion vector information to generate the prediction image corresponding to the target image block.

In step S3203, the evaluator 208 calculates the degree of similarity between the plurality of reference images for each frequency component to generate an importance degree map indicating degrees of importance of respective frequency components within the block.

In step S3204, the entropy code decoder 200 decodes the encoded data to acquire the transform coefficient sequence, rearranges the acquired transform coefficient sequence and outputs the transform coefficients arranged in two dimensions to the inverse quantizer/inverse transformer 201.

In step S3205, the inverse quantizer/inverse transformer 201 restores the prediction residual by performing inverse quantization and an inverse orthogonal transform of the transform coefficients (quantized transform coefficients) to generate the restored prediction residual.

In step S3206, the combiner 202 reconstructs the target image block by combining the restored prediction residual with the prediction image in a pixel unit to generate the reconstructed image.

In step S3207, the loop filter 204 performs filter processing on the reconstructed image.

In step S3208, the frame memory 205 stores and outputs the reconstructed image subjected to the filter processing in a frame unit.

3.9. Conclusion of Third Embodiment

The evaluator 111 of the image encoding device 1 evaluates the degree of similarity between the plurality of reference images for each frequency component and outputs information of the evaluation result to the entropy encoder 103. The entropy encoder 103 rearranges the transform coefficients input from the quantizer 102b based on the result of evaluation by the evaluator 111 and encodes the rearranged transform coefficients. By encoding the transform coefficients after rearranging the transform coefficients so that transform coefficients in frequency components in which the degree of similarity is low are converged (put together), it becomes possible to efficiently encode the transform coefficients and achieve efficient entropy encoding, so that it is possible to improve encoding efficiency.

The evaluator 208 of the image decoding device 2 evaluates the degree of similarity between the plurality of reference images for each frequency component and outputs information of the evaluation result to the entropy code decoder 200. The entropy code decoder 200 decodes the encoded data to acquire transform coefficients for each frequency component, rearranges the transform coefficients based on the result of evaluation by the evaluator 208 and outputs the rearranged transform coefficients. By the transform coefficients being rearranged based on the result of evaluation by the evaluator 208 in this manner, even if information specifying details of rearranging is not transmitted from the image decoding device 1, the entropy code decoder 200 can autonomously rearrange the transform coefficients. Therefore, the image decoding device 1 does not have to transmit information specifying details of rearranging, so that it is possible to avoid degradation of encoding efficiency.

3.10. Modifications of Third Embodiment

Figure 23:
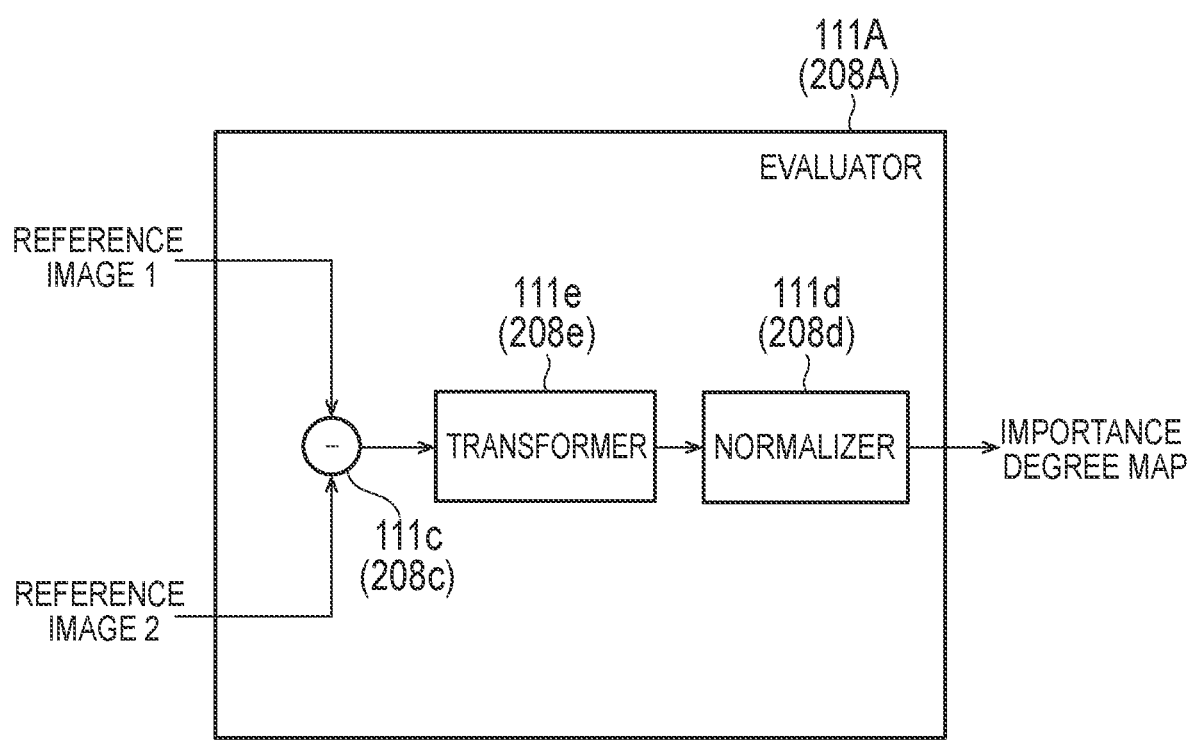
FIG. 23 illustrates a modification of a configuration of the evaluator according to the third embodiment.

FIG. 23 illustrates a modification of a configuration of the evaluator 111 of the image encoding device 1. As illustrated in FIG. 23, an evaluator 111A according to the present modification includes a similarity degree calculator 111c, a transformer 111e, and a normalizer 111d. Note that, while an example where the evaluator 111 includes the normalizer 111d will be described, the evaluator 111 does not necessarily have to include the normalizer 111d.

The similarity degree calculator 111c calculates a degree of similarity between the reference image 1 (first reference image) and the reference image 2 (second reference image) input from the motion compensation predictor 109 in a pixel unit, and outputs the degree of similarity calculated in a pixel unit to the transformer 111e. For example, an absolute value of a difference value can be used as the degree of similarity. A smaller absolute value indicates a higher degree of similarity, and a greater absolute value indicates a lower degree of similarity. The similarity degree calculator 111c may calculate the difference value after performing filter processing on the respective reference images. The similarity degree calculator 111c may calculate statistics such as a square error and may use the statistics as the degree of similarity. An example where the absolute value of the difference value is used as the degree of similarity will be described below.

The similarity degree calculator 111c calculates the degree of similarity for each frequency component by performing an orthogonal transform of the degree of similarity (difference value) in a pixel unit input from the similarity degree calculator 111c.

The normalizer 111d normalizes the difference value (transform coefficients) in a unit of frequency component input from the similarity degree calculator 111c with the difference value in a frequency component in which the difference value becomes a maximum within the block (that is, a maximum value of the absolute value of the difference value within the block) and outputs the normalized difference value.

The normalizer 111d may adjust the normalized difference value (degree of importance) input from the normalizer 111d based on at least one of the quantization parameter (Qp) which defines roughness of quantization and the quantization matrix to which quantization values different for each transform coefficient are applied, and may output the adjusted normalized difference value.

The degree of importance Rij of each frequency component (ij) output from the evaluator 111A according to the modification can be expressed with, for example, the following expression (5).

$$Rij = \mathrm{abs}(Dij)/\mathrm{maxD} \times \mathrm{Scale}(Qp) \qquad (5)$$

In expression (5), Dij is a transform coefficient of the frequency component ij, and abs is a function for obtaining an absolute value. The transformer 111e outputs abs(Dij).

Further, in expression (5), maxD is a maximum value of the transform coefficients within the block. While it is necessary to obtain the transform coefficients for all frequency components within the block to obtain maxD, it is also possible to use a maximum value, or the like, of an adjacent block which has already been subjected to encoding processing as a substitute for the transform coefficients for all frequency components within the block to skip this processing. Alternatively, it is also possible to obtain maxD from the quantization parameter (Qp) and the quantization value of the quantization matrix using a table which defines correspondence relationship between the quantization parameter (Qp) and the quantization value of the quantization matrix, and maxD. Alternatively, it is also possible to use a fixed value defined in specifications in advance as maxD. The normalizer 111d outputs abs(Dij)/maxD. In expression (5), Scale(Qp) is similar to that in the above-described third embodiment.

In this manner, the evaluator 111A according to the modification generates the importance degree map including degrees of importance Rij of respective frequency components ij within the block and outputs the generated importance degree map to the entropy encoder 103.

The evaluator 111A according to the modification can achieve reduction of the number of orthogonal transformers compared to the evaluator 111 according to the above-described third embodiment, and thus can achieve reduction of processing load. Typically, orthogonal transform used in encoding of an image is substantially normal orthogonal transform, and thus, the evaluator 111A according to the modification can provide performance which is equivalent to that provided by the evaluator 111 according to the third embodiment.

Further, in the modification, the evaluator 208A of the image decoding device 2 is configured in a similar manner to the evaluator 111A of the image encoding device 1. Specifically, the evaluator 208A of the image decoding device 2 includes a similarity degree calculator 208c, a transformer 208e, and a normalizer 208d. The evaluator 208A of the image decoding device 2 outputs the importance degree map including the degrees of importance Rij of the respective frequency components ij within the block to the entropy code decoder 200.

4. Other Embodiments

Figure 14:
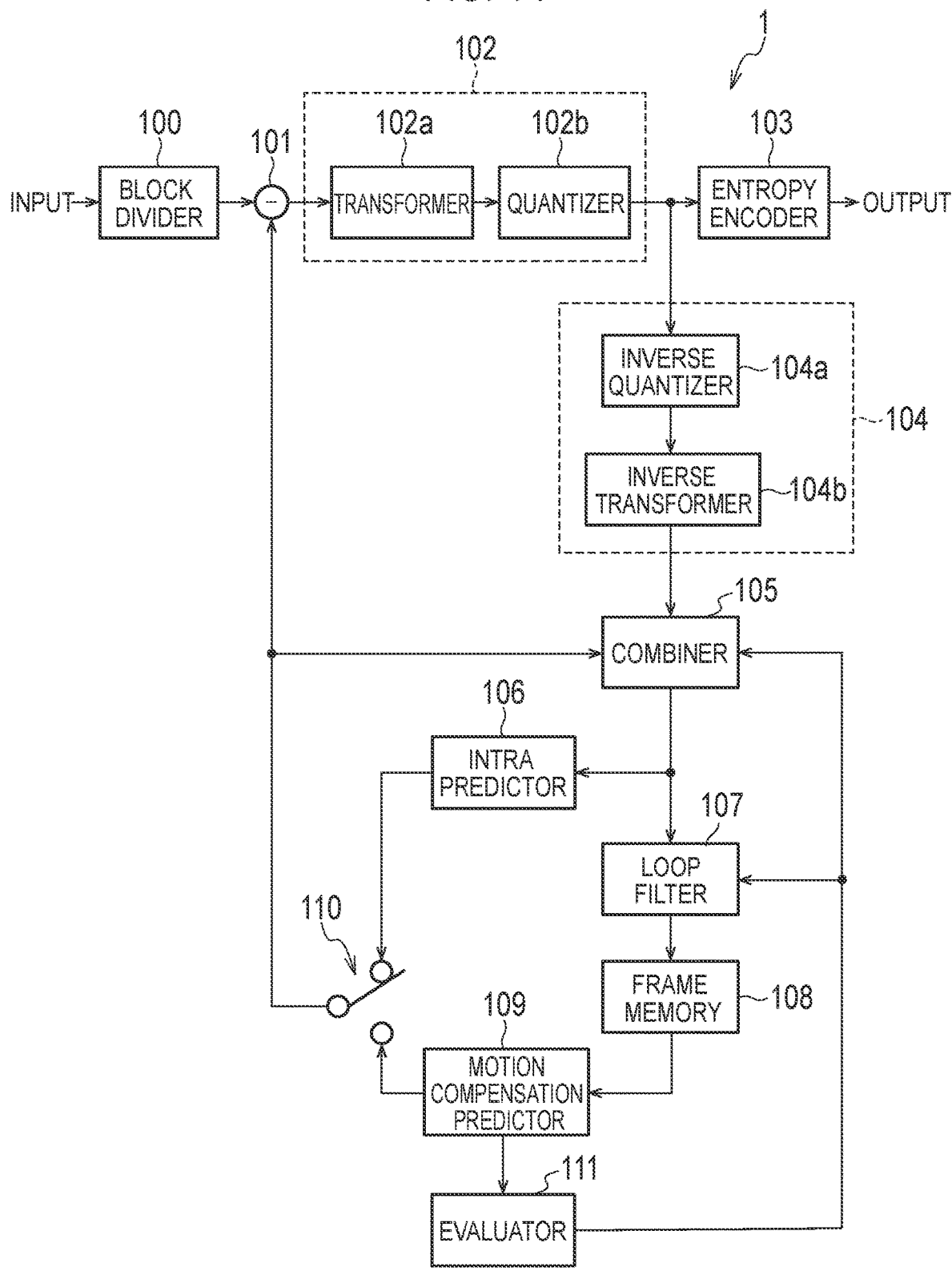
FIG. 14 illustrates a configuration of an image encoding device in a case of combination of the first embodiment and the second embodiment.
Figure 15:
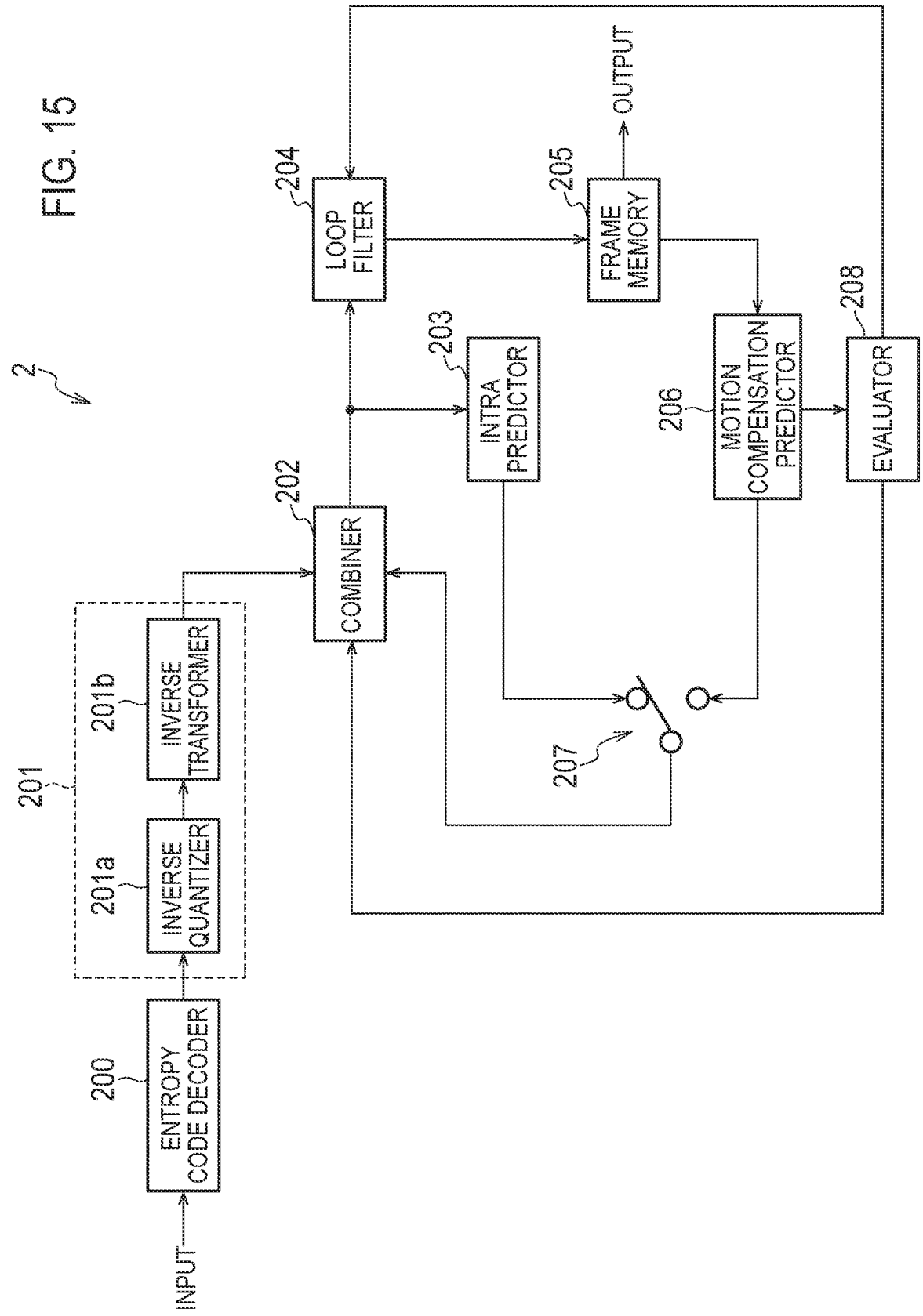
FIG. 15 illustrates a configuration of an image decoding device in a case of combination of the first embodiment and the second embodiment.

The above-described first embodiment and second embodiment may be combined. FIG. 14 illustrates a configuration of the image encoding device 1 in a case where the first embodiment and the second embodiment are combined. As illustrated in FIG. 14, the evaluator 111 outputs the evaluation result (map information) to both the combiner 105 and the loop filter 107. FIG. 15 illustrates a configuration of the image decoding device 2 in a case where the first embodiment and the second embodiment are combined. As illustrated in FIG. 15, the evaluator 208 outputs the evaluation result (map information) to both the combiner 202 and the loop filter 204.

An example has been described in the above-described third embodiment where the entropy encoder 103 reads out all the transform coefficients arranged in two dimensions in descending order of the degree of importance and performs serialization processing. However, only top several transform coefficients may be read out in descending order of the degree of importance among the transform coefficients arranged in two dimensions, and other transform coefficients may be read out in fixed order defined by the system. Alternatively, readout order of the transform coefficients arranged in two dimensions may be advanced or postponed by a predetermined number in accordance with the degree of importance.

In the above-described third embodiment, while it is possible to use zigzag scanning as employed in, for example, MPEG2 as scanning order of the transform coefficients, for example, in a case of HEVC (see Non-Patent Literature 1) which is the latest coding scheme, transform coefficients are rearranged in a unit called CG obtained by grouping the transform coefficients into 4×4 transform coefficients within the block. It is determined whether or not there is a non-zero coefficient within the CG, and in a case where there is a non-zero coefficient within the CG, transform coefficients within the CG are serialized and encoded. It is also possible to apply operation according to the above-described third embodiment to rearranging of transform coefficients upon readout of the transform coefficients within the CG. Alternatively, it is also possible to apply the operation to serialization of determining readout order of the CG and apply the operation to rearranging of readout order by calculating an average of degrees of similarity between orthogonal transform coefficients within the CG and comparing the degrees of similarity for each CG.

In the above-described respective embodiments, inter prediction has been mainly described as motion compensation prediction. In the inter prediction, reference images within a frame different from the current frame are used to predict the target image block of the current frame. However, the present invention is not limited to motion compensation prediction, and, for example, can be applied to a plurality of reference blocks in a technique called intra block copy. In the intra block copy, reference images within the same frame as the current frame are used to predict the target image block of the current frame.

The above-described specific examples of the present invention may be provided by a program which causes a computer to execute respective kinds of processing to be performed by the image encoding device 1 and a program which causes a computer to execute respective kinds of processing to be performed by the image decoding device 2. Further, the programs may be stored in a computer readable medium. Use of the computer readable medium allows the programs to be installed onto the computer. Here, the computer readable medium in which the programs are recorded may be a non-transitory recording medium. The non-transitory recording medium is not particularly limited, but for example, a recording medium such as a CD-ROM and a DVD-ROM. Further, circuits which execute respective kinds of processing to be performed by the image encoding device 1 may be integrated to configure the image encoding device 1 as a semiconductor integrated circuit (chip set, SoC). In a similar manner, circuits which execute respective kinds of processing to be performed by the image decoding device 2 may be integrated to configure the image decoding device 2 as a semiconductor integrated circuit (chip set, SoC).

The embodiments have been described in detail above with reference to the drawings. Specific configurations are not limited to the above-described configurations, and various design changes, and the like are possible within the scope not deviating from the gist.

Note that the present application claims the benefit of priority from Japanese Patent Application No. 2018-065895 (filed on Mar. 29, 2018), and Japanese Patent Application No. 2018-065886 (filed on Mar. 29, 2018), the entire contents of which are incorporated herein by reference.

The invention claimed is:

1. An image encoding device for encoding a target image in a block unit, the image encoding device comprising:
   a predictor circuitry configured to generate a block of a prediction image corresponding to a block of the target image by performing prediction using a plurality of reference images;
   a calculator circuitry configured to calculate a degree of similarity between the plurality of reference images for each image portion that is a smaller unit than the block and includes a plurality of pixels,
   an evaluator circuitry configured to evaluate a prediction accuracy of the block of the prediction image for each image portion based on the degree of similarity calculated for the image portion;
   a transformer/quantizer circuitry configured to perform a transform and a quantization of a prediction residual indicating a difference in a pixel unit between the block of the target image and the block of the prediction image;
   an inverse quantizer/inverse transformer circuitry configured to restore the prediction residual by performing an inverse quantization and an inverse transform of quantized transform coefficients input from the transformer/quantizer; and
   a combiner circuitry configured to reconstruct the block of the target image by combining the restored prediction residual input from the inverse quantizer/inverse transformer with the block of the prediction image in a pixel unit, wherein
   a result of evaluation by the evaluator circuitry is used for modifying a target to combine of the combiner in the image portion unit.

2. The image encoding device according to claim 1, wherein
   the evaluator includes a normalizer configured to normalize a value indicating the degree of similarity between the plurality of reference images.

3. The image encoding device according to claim 1, wherein
the combiner is configured to control the restored prediction residual to be combined with the block of the prediction image for each image portion based on the result of evaluation by the evaluator.

4. The image encoding device according to claim 3, wherein
the combiner comprises:
a weight applier configured to apply a weight to the restored prediction residual to be combined with the block of the prediction image for each image portion; and
an adder configured to add the weighted restored prediction residual to the block of the prediction image in a pixel unit, and
the evaluator sets the weight to be applied for each image portion based on the result of evaluation.

5. An image decoding device for decoding a target image in a block unit, the image decoding device comprising:
a predictor circuitry configured to generate a block of a prediction image corresponding to a block of the target image by performing prediction using a plurality of reference images;
a calculator circuitry configured to calculate a degree of similarity between the plurality of reference images for each image portion that is a smaller unit than the block and includes a plurality of pixels,
an evaluator circuitry configured to evaluate a prediction accuracy of the block of the prediction image for each image portion based on the degree of similarity calculated for the image portion;
an inverse quantizer/inverse transformer circuitry configured to restore a prediction residual indicating a difference in a pixel unit between the block of the target image and the block of the prediction image by performing an inverse quantization and an inverse transform of quantized transform coefficients obtained by performing a transform and a quantization of the prediction residual at an image encoding device; and
a combiner circuitry configured to reconstruct the block of the target image by combining the restored prediction residual input from the inverse quantizer/inverse transformer with the block of the prediction image in a pixel unit, wherein
a result of evaluation by the evaluator circuitry is used for modifying a target to combine of the combiner in the image portion unit.

6. The image decoding device according to claim 5, wherein
the evaluator includes a normalizer configured to normalize a value indicating the degree of similarity between the plurality of reference images.

7. The image decoding device according to claim 5, wherein
the combiner is configured to control the restored prediction residual to be combined with the prediction image for each image portion based on the result of evaluation by the evaluator.

8. The image decoding device according to claim 7, wherein
the combiner comprises:
a weight applier configured to apply a weight to the restored prediction residual to be combined with the block of the prediction image for each image portion; and
an adder configured to add the weighted restored prediction residual to the block of the prediction image in a pixel unit, and
the evaluator is configured to set the weight to be applied for each image portion based on the result of evaluation.

9. An image decoding method for decoding a target image in a block unit, the image decoding method comprising:
a step of generating a block of a prediction image corresponding to a block of the target image by performing prediction using a plurality of reference images;
a calculating step of calculating a degree of similarity between the plurality of reference images for each image portion that is a smaller unit than the block and includes a plurality of pixels;
an evaluate step of generating an evaluate value for each image portion based on the degree of similarity calculated for the image portion;
a step of restoring a prediction residual indicating a difference in a pixel unit between the block of the target image and the block of the prediction image by performing an inverse quantization and an inverse transform of quantized transform coefficients obtained by performing a transform and a quantization of the prediction residual at an image encoding side; and
a combine step of reconstructing the block of the target image by combining the restored prediction residual obtained by the step of restoring a prediction residual with the prediction image in a pixel unit, wherein
the evaluate value at the evaluate step is used for modifying a target to combine at the combine step in the image portion unit.

* * * * *